US012643438B2

(12) United States Patent
 Mchugh et al.

(10) Patent No.: US 12,643,438 B2
(45) Date of Patent: Jun. 2, 2026

(54) CHILD RESTRAINT

(71) Applicant: Dorel Juvenile Group, Inc., Foxboro, MA (US)

(72) Inventors: William P. Mchugh, Norfolk, MA (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 130 days.

(21) Appl. No.: 18/383,702

(22) Filed: Oct. 25, 2023

(65) Prior Publication Data

US 2024/0140278 A1 May 2, 2024

Related U.S. Application Data

(60) Provisional application No. 63/545,654, filed on Oct. 25, 2023, provisional application No. 63/545,650, filed on Oct. 25, 2023, provisional application No. 63/545,648, filed on Oct. 25, 2023, provisional application No. 63/419,505, filed on Oct. 26, 2022.

(51) Int. Cl.
 *B60N 2/28* (2006.01)

(52) U.S. Cl.
 CPC ......... *B60N 2/2821* (2013.01); *B60N 2/2869* (2013.01); *B60N 2/2875* (2013.01)

(58) Field of Classification Search
 CPC ... B60N 2/2875; B60N 2/2821; B60N 2/2869
 USPC ....................................... 297/256.12, 256.13
 See application file for complete search history.

(56) References Cited

U.S. PATENT DOCUMENTS

| | | | | |
|---|---|---|---|---|
| 5,183,312 | A | * | 2/1993 | Nania .................. B60N 2/2821 |
| | | | | 248/425 |
| 6,318,807 | B1 | | 11/2001 | Perego |
| 7,338,122 | B2 | | 3/2008 | Hei |
| 7,357,451 | B2 | | 4/2008 | Bendure |
| 7,559,606 | B2 | | 7/2009 | Hei |
| 7,575,276 | B1 | | 8/2009 | Henry |
| 7,735,921 | B2 | | 6/2010 | Hutchinson |
| 7,770,970 | B2 | | 8/2010 | Hei |
| 7,828,381 | B2 | | 11/2010 | Barger |
| 7,887,129 | B2 | | 2/2011 | Hei |
| 8,235,465 | B2 | | 8/2012 | Hei |

(Continued)

FOREIGN PATENT DOCUMENTS

| | | |
|---|---|---|
| AU | 2011200416 | 8/2011 |
| AU | 2012203174 | 12/2012 |

(Continued)

OTHER PUBLICATIONS

French Ministry of Ecology Communication Concerning Approval of TeamTex's D15 - Revo, dated Feb. 6, 2015, English translation included, 4 pages.

(Continued)

*Primary Examiner* — Milton Nelson, Jr.
(74) *Attorney, Agent, or Firm* — Barnes & Thornburg LLP

(57) ABSTRACT

A child restraint includes a juvenile seat adapted to support a child in a vehicle and a seat base adapted to rest on a vehicle seat. The seat base is fixed to the vehicle seat to support the juvenile seat for transportation in the vehicle. The juvenile seat can move from a rearward-facing orientation to a forward-facing orientation for children of varying sizes.

18 Claims, 14 Drawing Sheets

(56) References Cited

U.S. PATENT DOCUMENTS

| 8,256,841 B2 | 9/2012 | Hei |
| 8,317,265 B2 | 11/2012 | Hutchinson |
| 8,328,275 B2 | 12/2012 | Vogt |
| 8,474,907 B2 | 7/2013 | Weber |
| 8,511,749 B2 | 8/2013 | Hei |
| 8,616,632 B2 | 12/2013 | Cheng |
| 8,905,478 B2 | 12/2014 | Strong |
| 9,090,182 B2 | 7/2015 | Rabeony |
| 9,487,111 B2 | 11/2016 | Lake |
| 9,969,305 B1 | 5/2018 | Sheriff |
| 10,173,553 B2 | 1/2019 | Mitchell |
| 10,315,537 B2 | 6/2019 | Renaudin |
| 10,384,570 B2 | 8/2019 | Pline |
| 10,406,947 B2 | 9/2019 | Anderson |
| 10,449,876 B2 | 10/2019 | Lonstein |
| 10,457,168 B2 | 10/2019 | Anderson |
| 10,464,451 B2 | 11/2019 | Stamper |
| 10,583,756 B2 | 3/2020 | Anderson |
| 10,640,020 B2 * | 5/2020 | Jung .................... B60N 2/2875 |
| 10,688,892 B2 | 6/2020 | Anderson |
| 10,710,478 B2 | 7/2020 | Reaves |
| 10,766,384 B2 | 9/2020 | Schmitz |
| 10,780,800 B2 | 9/2020 | Kaiser |
| 10,829,013 B2 | 11/2020 | Cohen |
| 11,420,540 B2 | 8/2022 | Williams |
| 11,427,114 B2 | 8/2022 | Keegan |
| 2015/0336481 A1 | 11/2015 | Horsfall |
| 2019/0077282 A1 | 3/2019 | Reaves |
| 2019/0232827 A1 | 8/2019 | Maciejczyk |
| 2020/0215941 A1 | 7/2020 | Resch |
| 2020/0276920 A1 | 9/2020 | Liu |
| 2020/0391625 A1 | 12/2020 | Williams |
| 2021/0070244 A1 | 3/2021 | Guo |
| 2021/0237626 A1 | 8/2021 | Longenecker |
| 2022/0048415 A1 | 2/2022 | Keegan |
| 2022/0212575 A1 | 7/2022 | Williams |
| 2022/0219581 A1 | 7/2022 | Brunick |
| 2022/0355713 A1 | 11/2022 | Longenecker |
| 2022/0402413 A1 | 12/2022 | Dingman |

FOREIGN PATENT DOCUMENTS

| AU | 2016253691 | | 12/2016 | |
| CN | 202911586 U | | 5/2013 | |
| CN | 103182966 B | | 11/2015 | |
| CN | 106985714 A | | 7/2017 | |
| CN | 107161045 A | | 9/2017 | |
| CN | 111703344 A | | 9/2020 | |
| CN | 111873864 A | | 11/2020 | |
| CN | 111923795 A | | 11/2020 | |
| EP | 1110807 | | 6/2001 | |
| EP | 3750743 A1 * | 12/2020 | .......... B60N 2/2812 |
| JP | 2002087123 | | 3/2002 | |
| JP | 4073233 B2 | | 4/2008 | |
| WO | 2015027275 | | 3/2015 | |

OTHER PUBLICATIONS

Dupuy Julien, Swivel Car Seat "Revo", video available from at https://www.youtube.com/watch?v=9x8keT1uagY, posted on Jan. 13, 2025.

Dupuy Julien, Revo Ferrari, video available from at https://www.youtube.com/watch?v=IVkmqFFujdw, posted on Dec. 18, 2015.

Babycitych, Revo Ferrari / 0-18 kg / 0-4 ans (Jahre Alt) / Pivotant—Drehbar 360°, video available at https://www.youtube.com/watch?v=5vWZaIQJw_s, Jan. 18, 2016.

Ellermeyer_trade, Nania autostoel Revo Groep 0+ en Groep 1, vidoe available at https://www.youtube.com/watch? V=MEuKNiy -- Jo, Mar. 3, 2015.

Babycitych, Nania REVO / 0-18 kg / 0-4 ans (Jahre Alt) / 360°, video available at https://www.youtube.com/watch? V=SsT9twTudb4, Nov. 25, 2014.

Österreichischer Automobil-, Motorrad- und Touringclub (the "ÖAMTC") Kindersitz-Test 2016.

TCS Schweiz-Suisse-Svizzero, Test TCS de sièges d'enfants 2016, video available at https://www.youtube.com/ watch?v=a-z2vqrDmko, May 24, 2016.

ANWB Auto, ANWB Autostoeltjestest 2016 Nania Revo Frontale Botsproef, video available from https://www.youtube. com/watch?v=dimtSn8VO2c, May 23, 2016.

Bol.com product listing webpage for the Nania Revo available at https://www.bol.com/nl/nl/p/nania-autostoel-revo-sp-draaibaar-groep-0en-1/9200000051607785/, at least available before 2017, 6 pages.

Maxi-Cosi, Maxi-Cosi | How to install the AxissFix car seat in your car, video available at https://www.youtube.com/ watch?v=W2prWbaNn3Y&t=42s, Dec. 12, 2014.

Maxi-Cosi, AxissFix Manual, at least available by 2015, 110 pages.

Maxi-Cosi, Maxi-Cosi Collection 2015, 2015, 2 pages.

ÖAMTC Kindersitz-Test 2015 featuring the Bebe Confort AxissFix review article titled "Sièges Auto Enfants" from the Jun. 2015 edition, 1 page.

Office Action (Non-Final Rejection) dated Apr. 8, 2026 for U.S. Appl. No. 18/898,995, (pp. 1-8).

* cited by examiner

CHILD RESTRAINT

PRIORITY CLAIM

This application claims priority under 35 U.S.C. § 119(e) to U.S. Provisional Patent Application No. 63/419,505 filed Oct. 26, 2022, U.S. Provisional Patent Application No. 63/545,648 filed Oct. 25, 2023, U.S. Provisional Patent Application No. 63/545,650 filed Oct. 25, 2023, and U.S. Provisional Patent Application No. 63/545,654 filed Oct. 25, 2023, each of which is expressly incorporated by reference herein in its entirety.

BACKGROUND

The present disclosure relates to child safety systems and devices, and particularly to child seats. More particularly, the present disclosure relates to a child seat for use in a vehicle.

SUMMARY

According to the present disclosure, a child restraint includes a juvenile seat adapted to support a child in a vehicle and a seat base adapted to rest on a vehicle seat. The seat base is fixed to the vehicle seat to support the juvenile seat for transportation in the vehicle. The juvenile seat can move from a rearward-facing orientation to a forward-facing orientation for children of varying sizes.

In illustrative embodiments, the child restraint further includes a seat-orientation controller fixed to the seat base for movement therewith and relative thereto about a vertical rotation axis and configured to mount the juvenile seat to the seat base for rotation about the vertical rotation axis with the seat-orientation controller. The seat-orientation controller includes a support frame coupled to the seat base and a juvenile-seat recline unit coupled to the support frame. The juvenile-seat recline unit is configured to move relative to the support frame and the seat base about a horizontal pivot axis to change the juvenile seat from a first reclined position relative to the seat base to a second reclined position relative to the seat base, the second reclined position having a different orientation relative to the vertical rotation axis than the first reclined position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a child restraint, in accordance with the present disclosure, including a seat base adapted to couple to a vehicle seat and a juvenile seat configured to attach to the seat base, and further showing that the seat base includes a seat-base foundation and a seat-orientation controller coupled to the seat-base foundation and configured to mount the juvenile seat to the seat base and provide rotation and recline functions for the juvenile seat;

Figure 4:
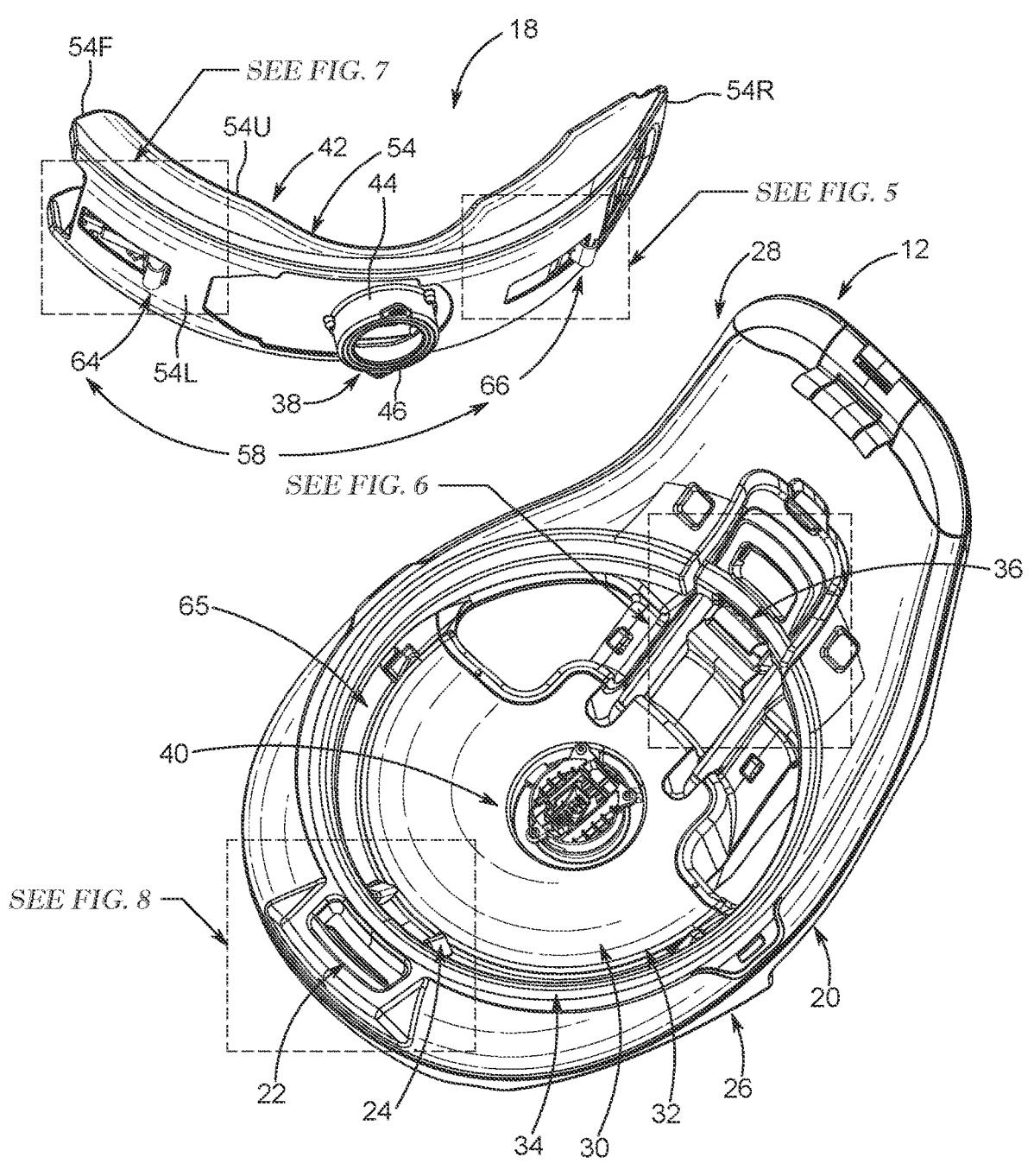
Figure 5:
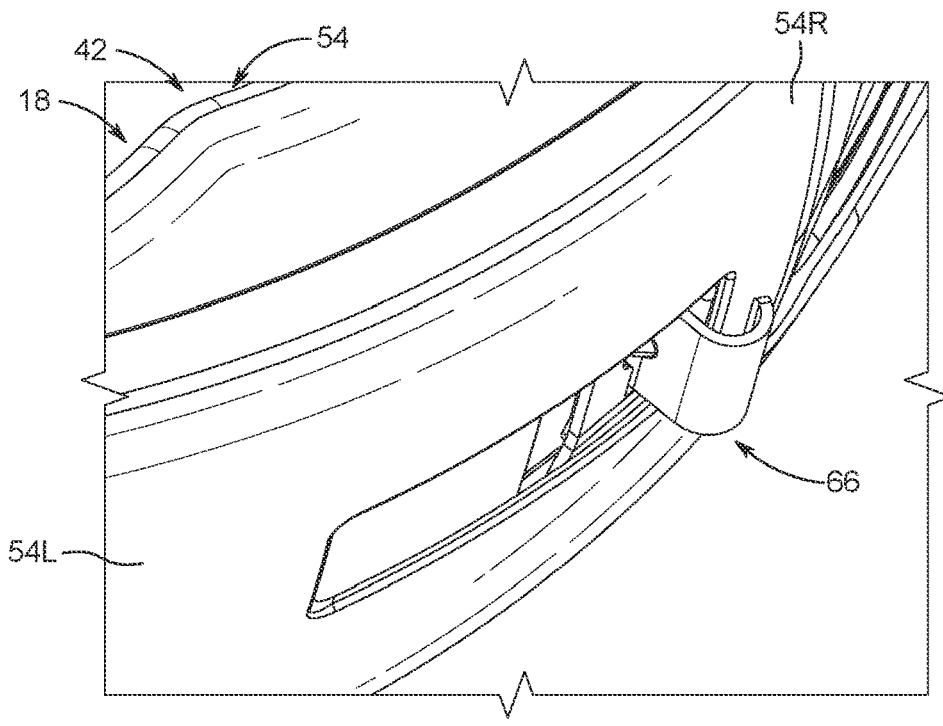
Figure 6:
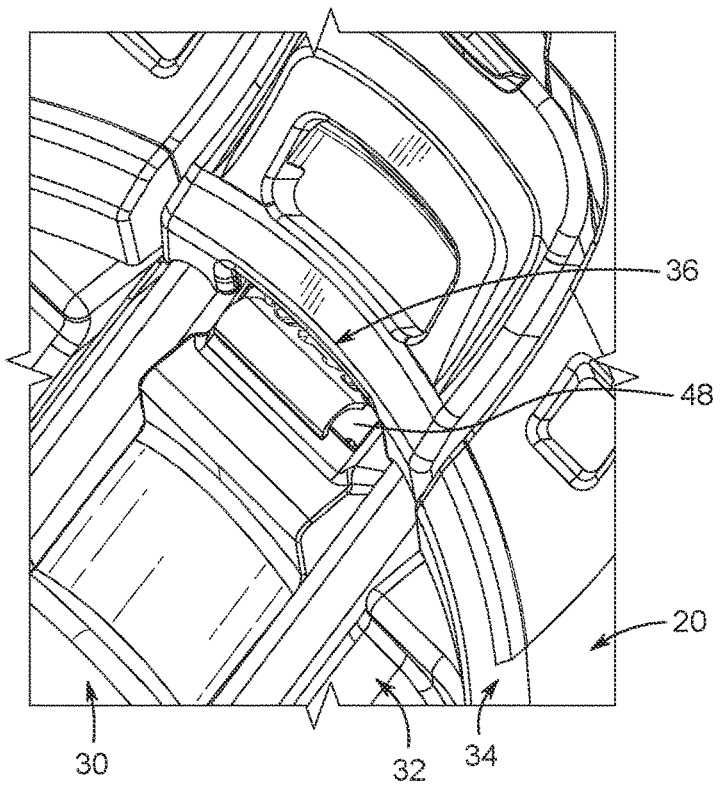
Figure 7:
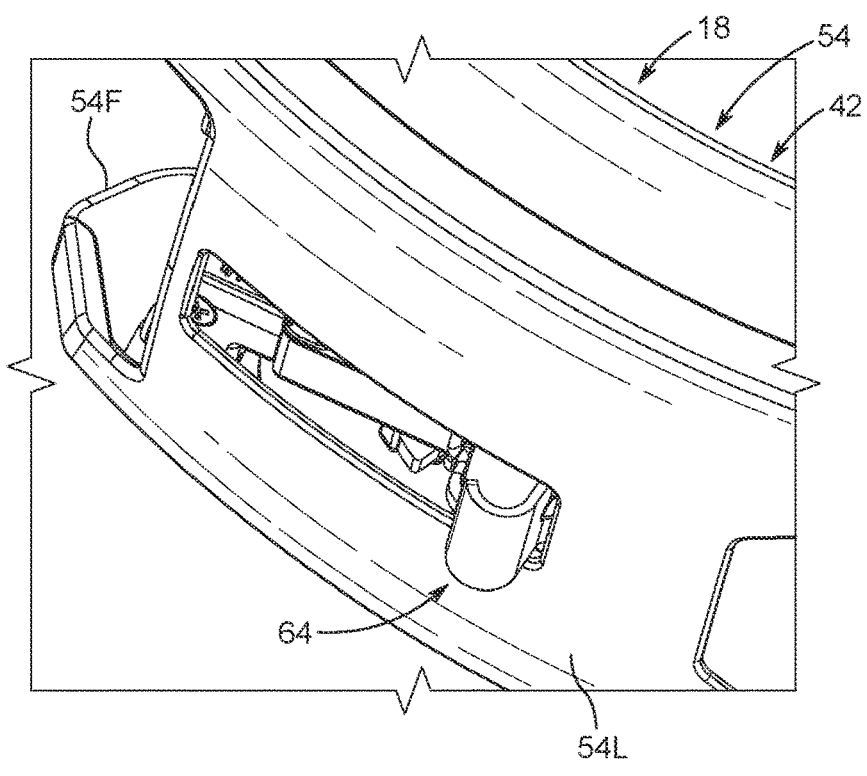
Figure 8:
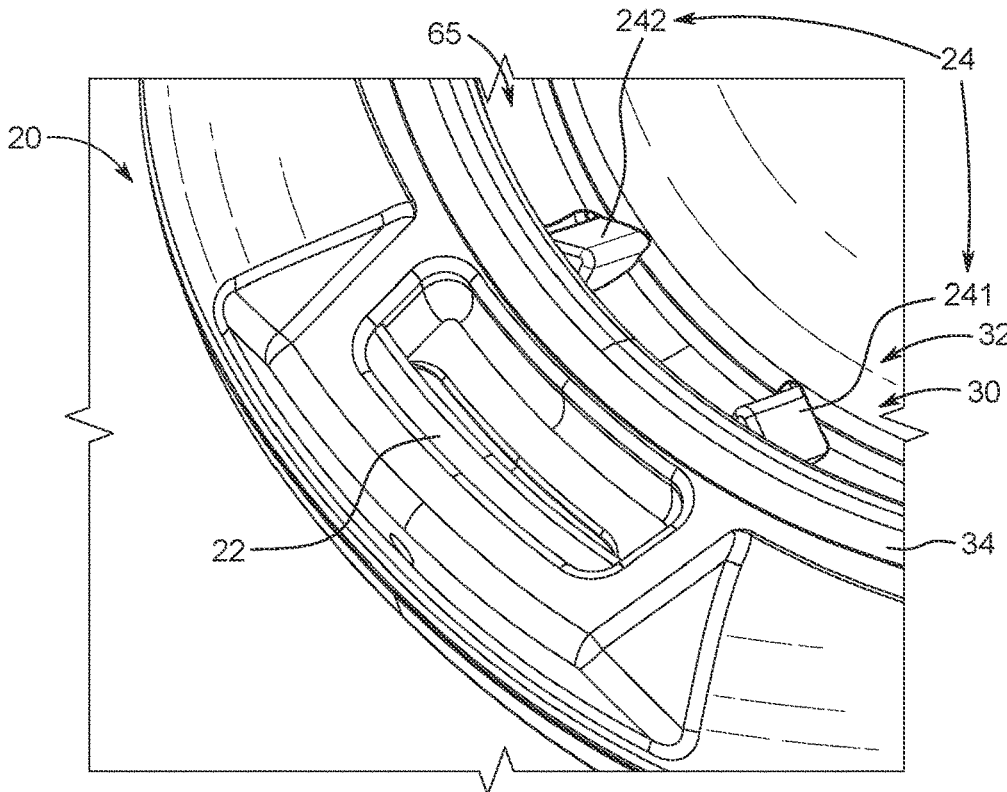
Figure 9:
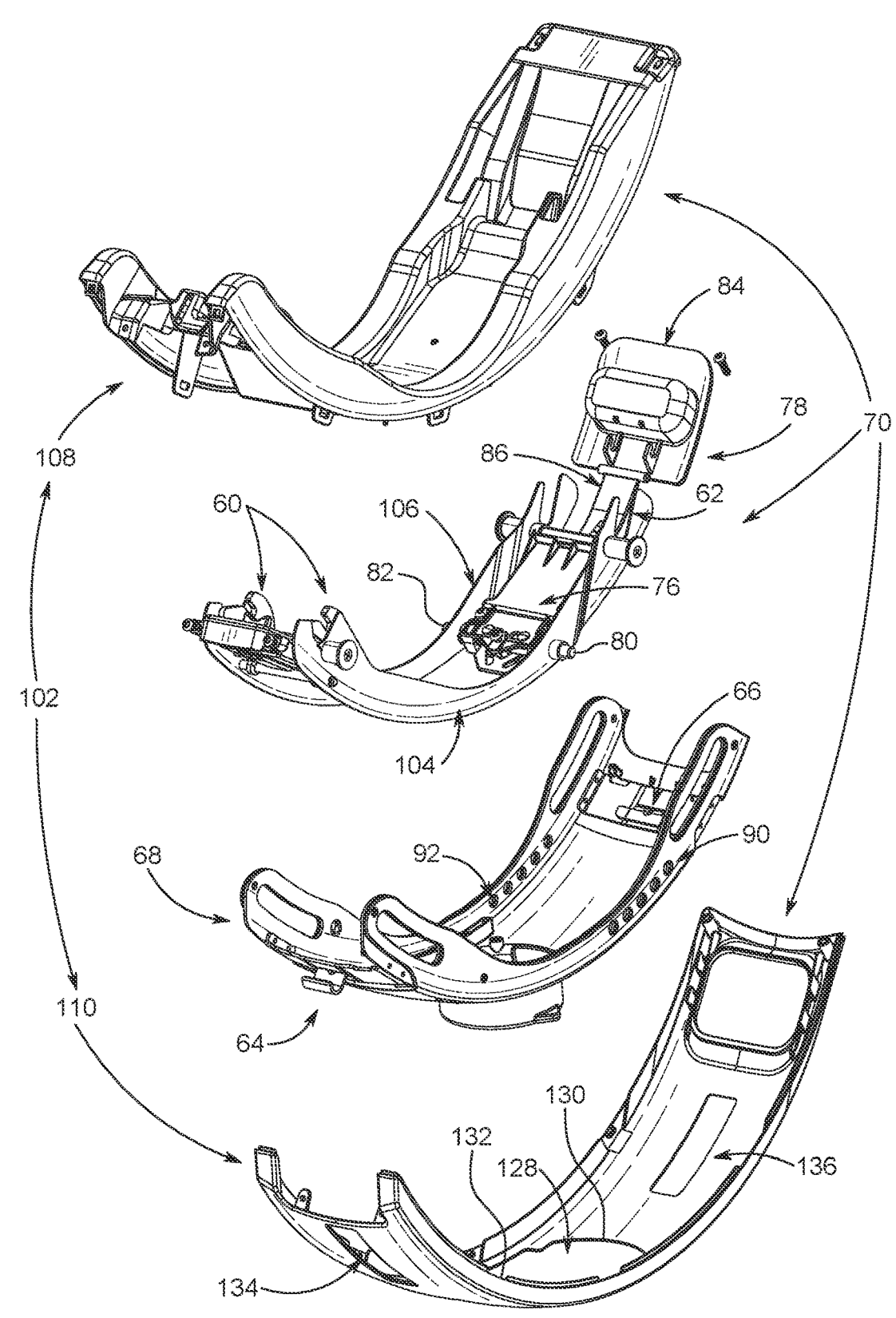
Figure 10:
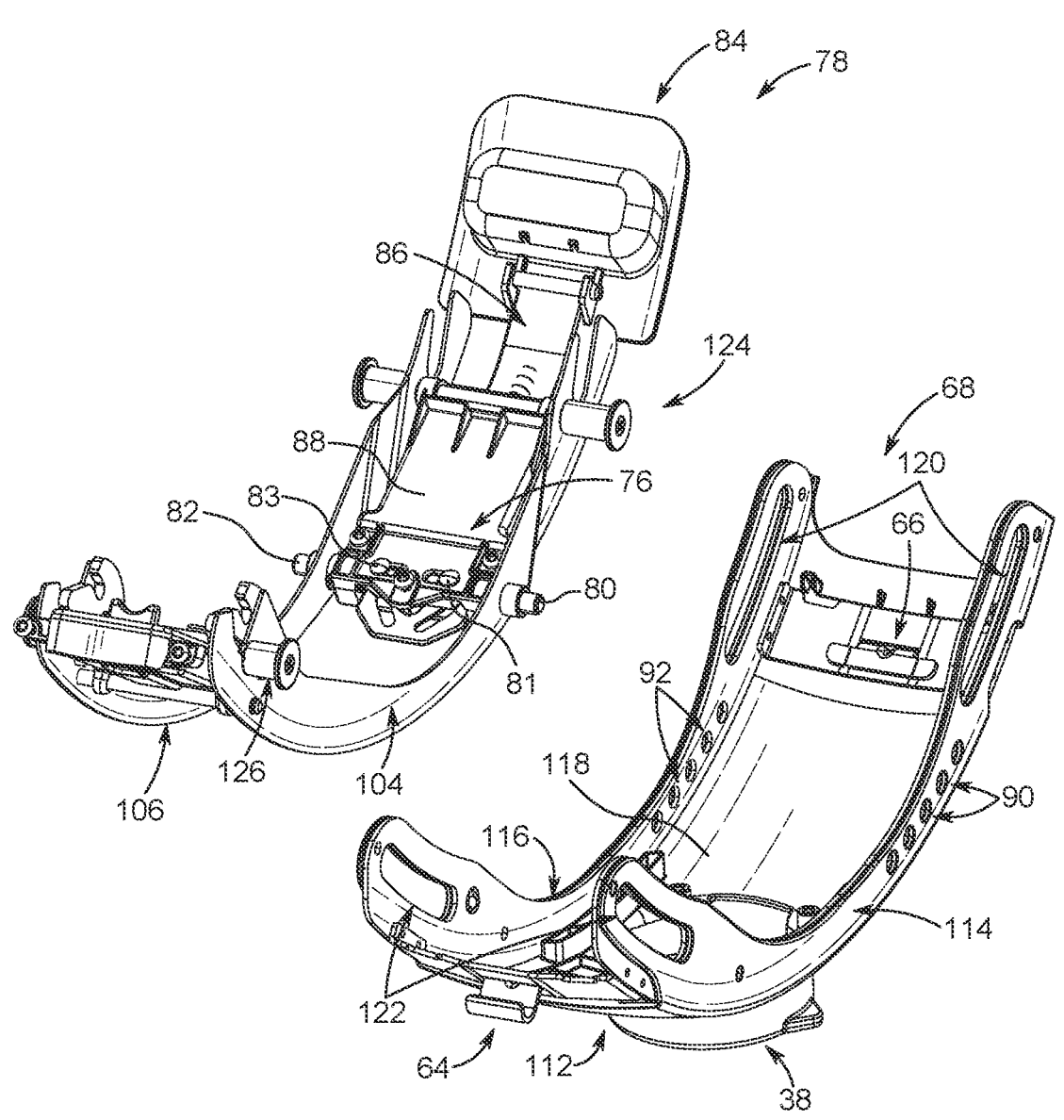
Figure 12:
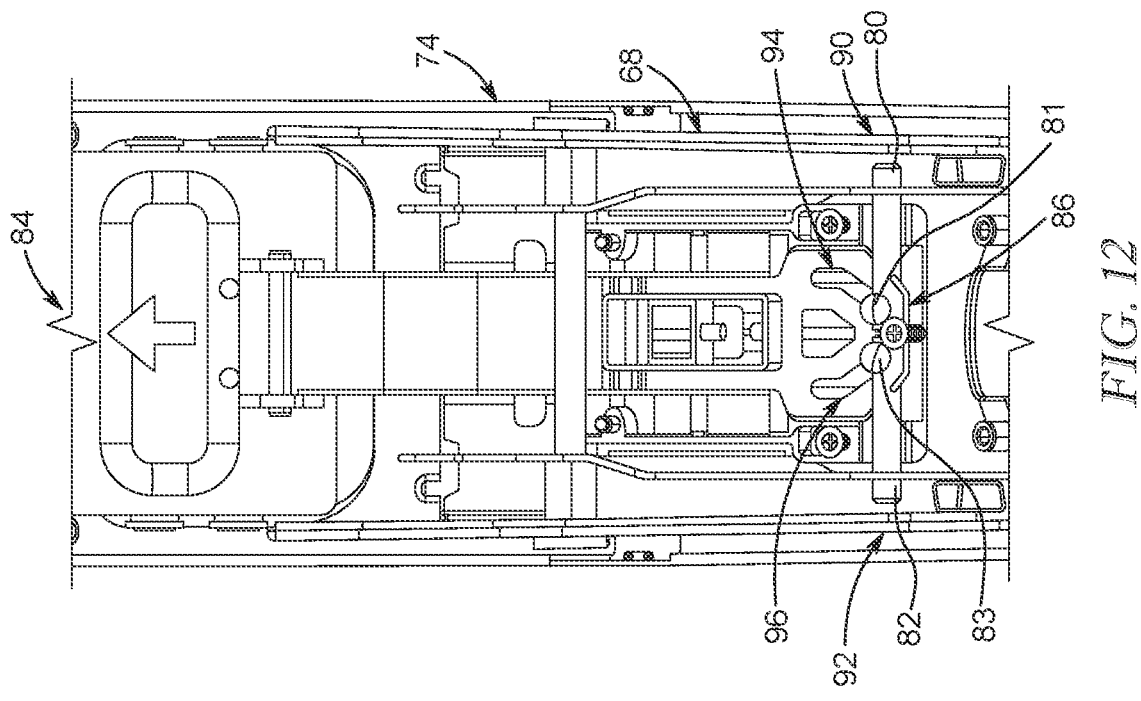
Figure 11:
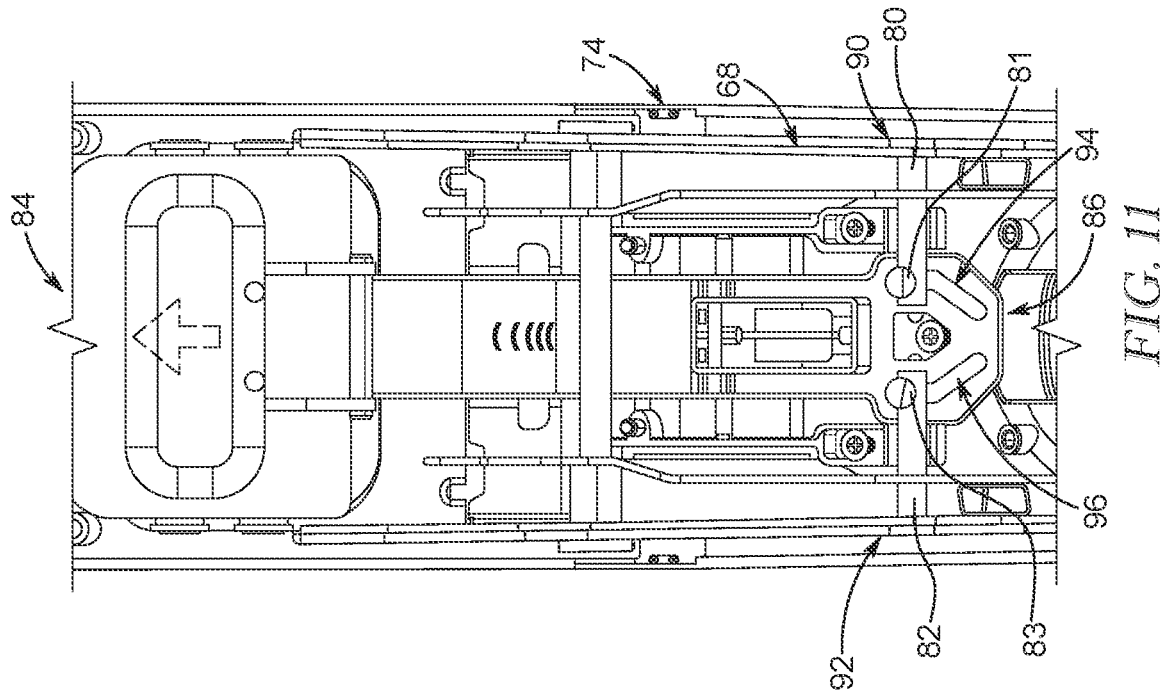
Figures 13, 14:
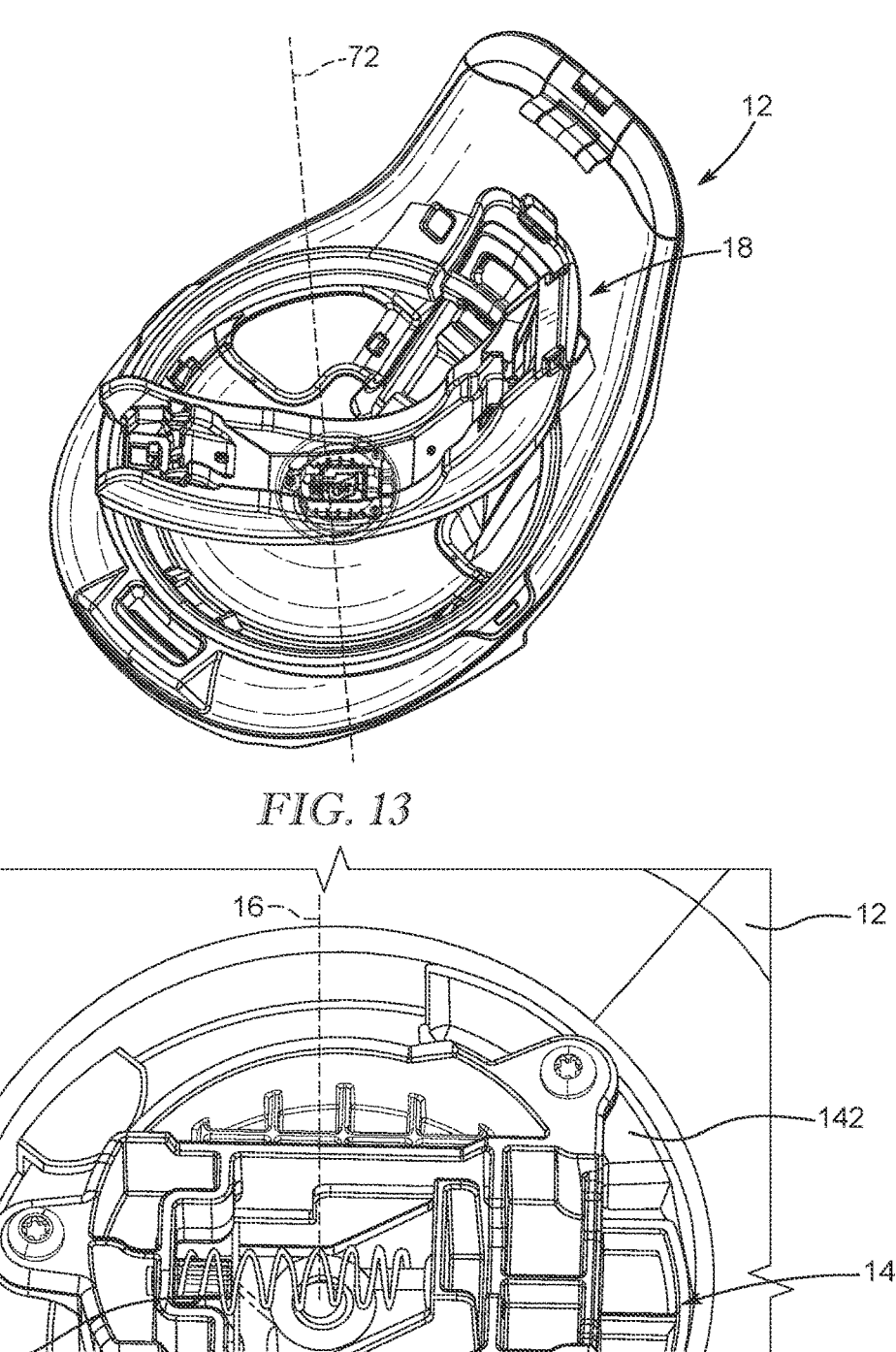
Figures 15, 16:
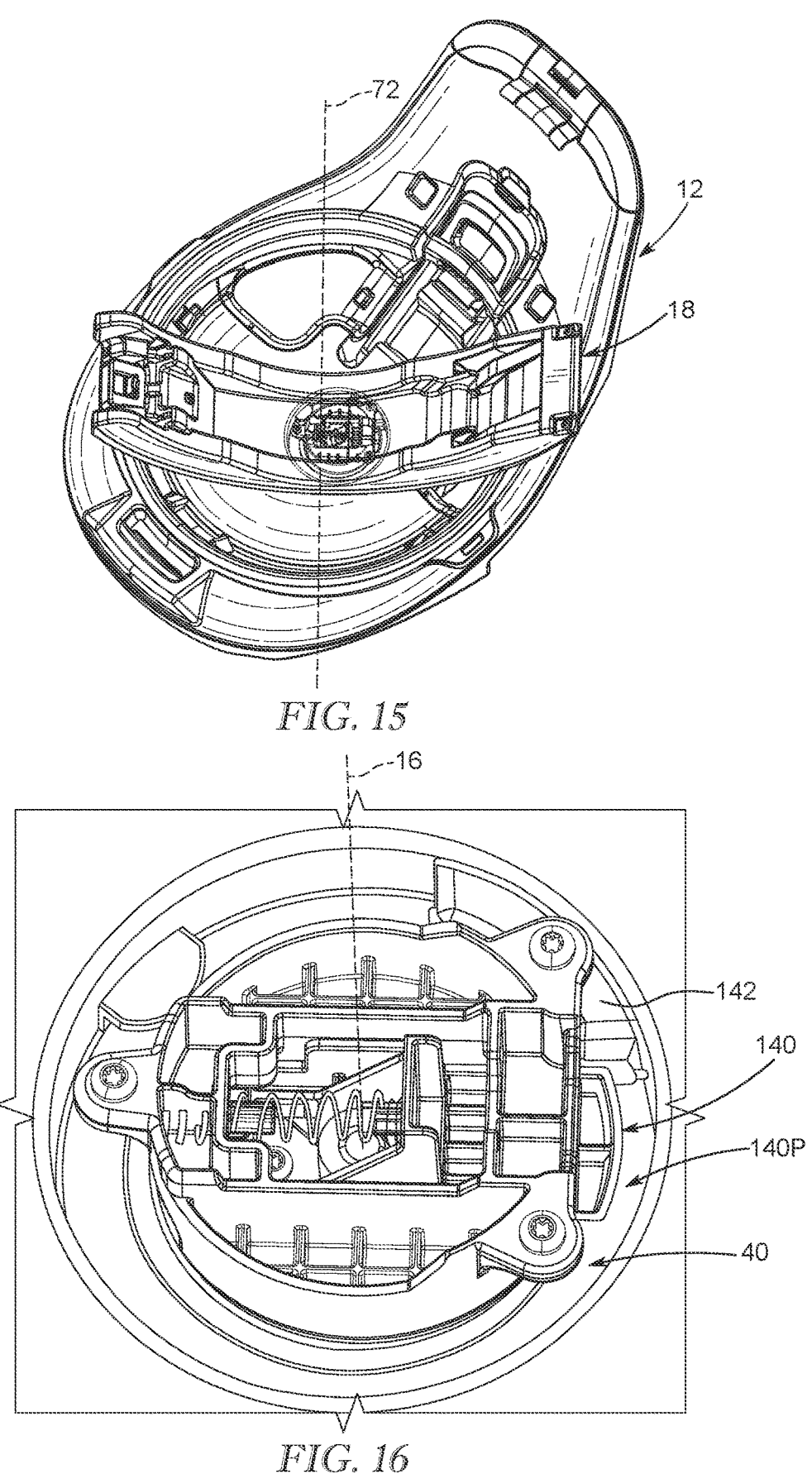
Figure 17:
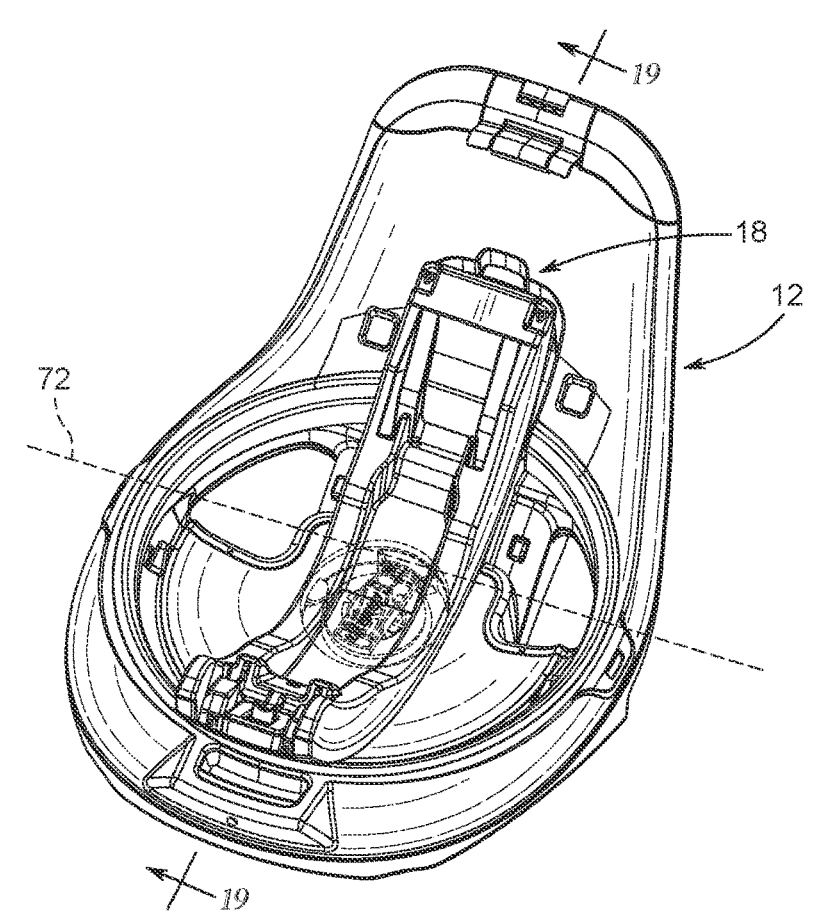
Figure 18:
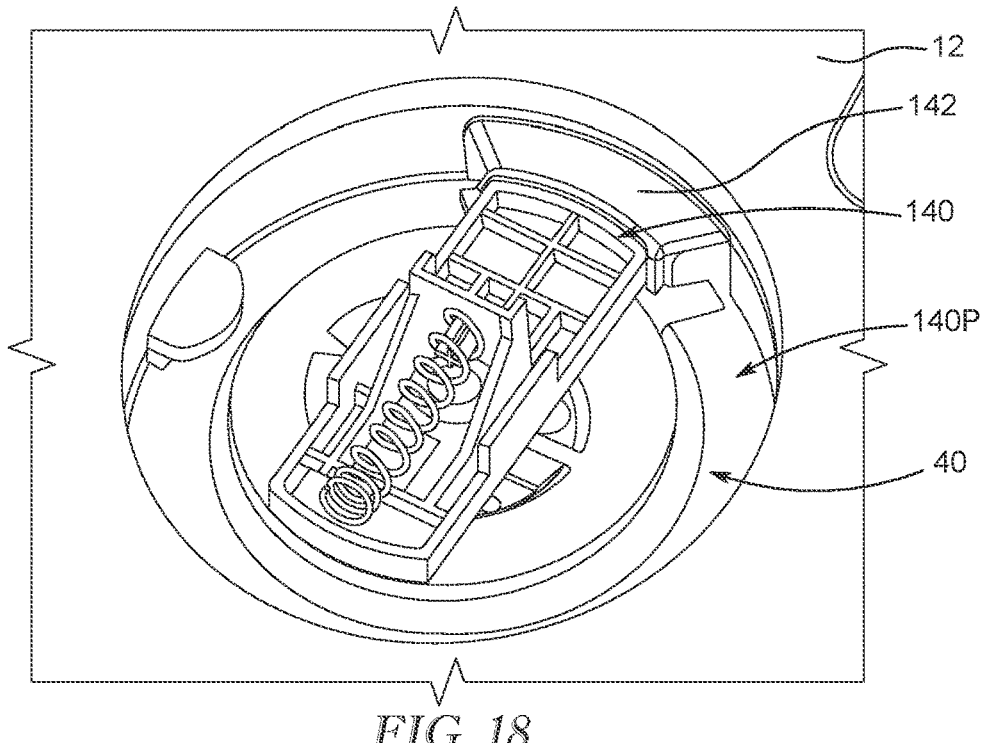
Figure 19:
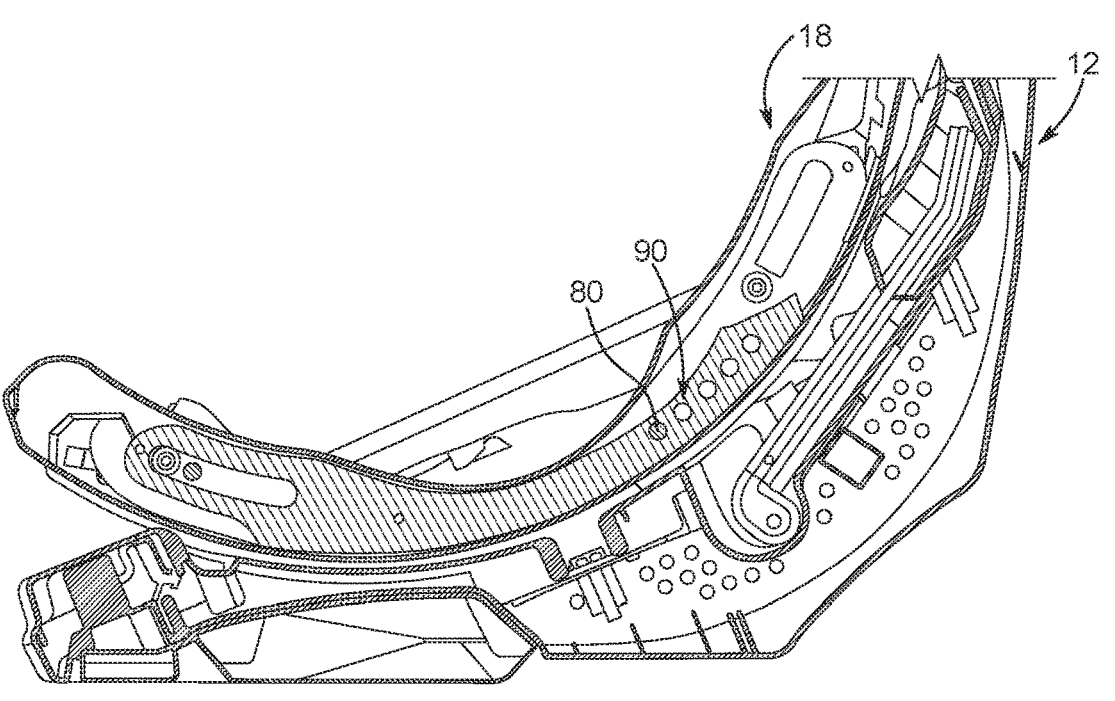
Figure 20:
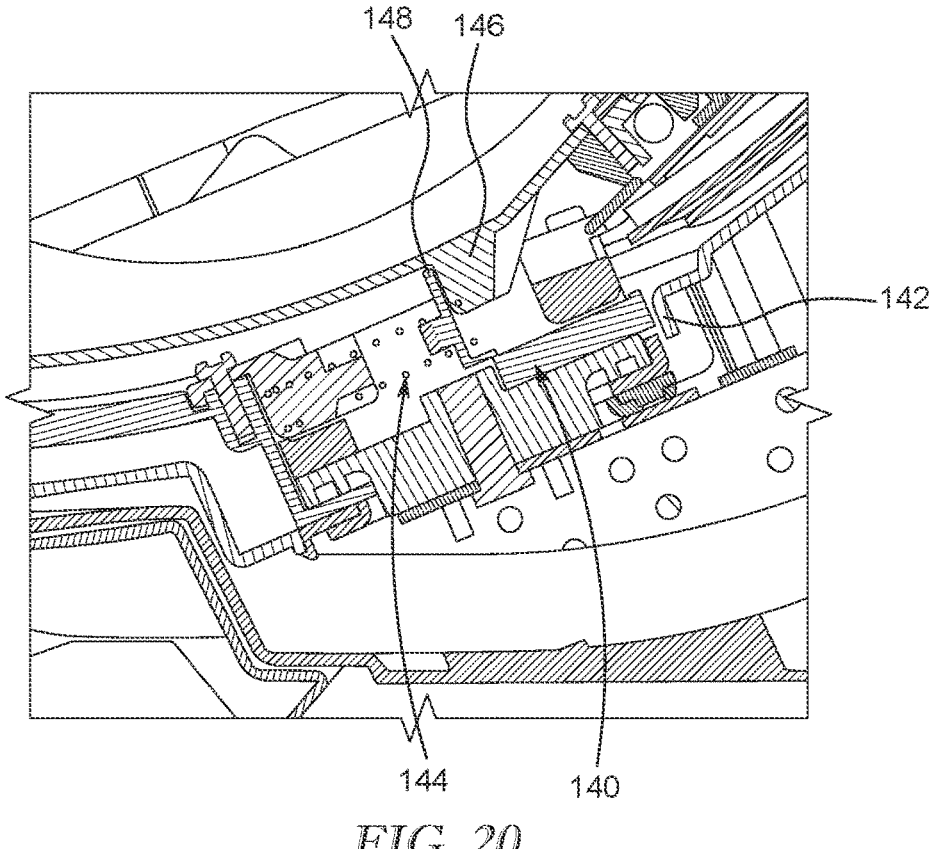
Figure 21:
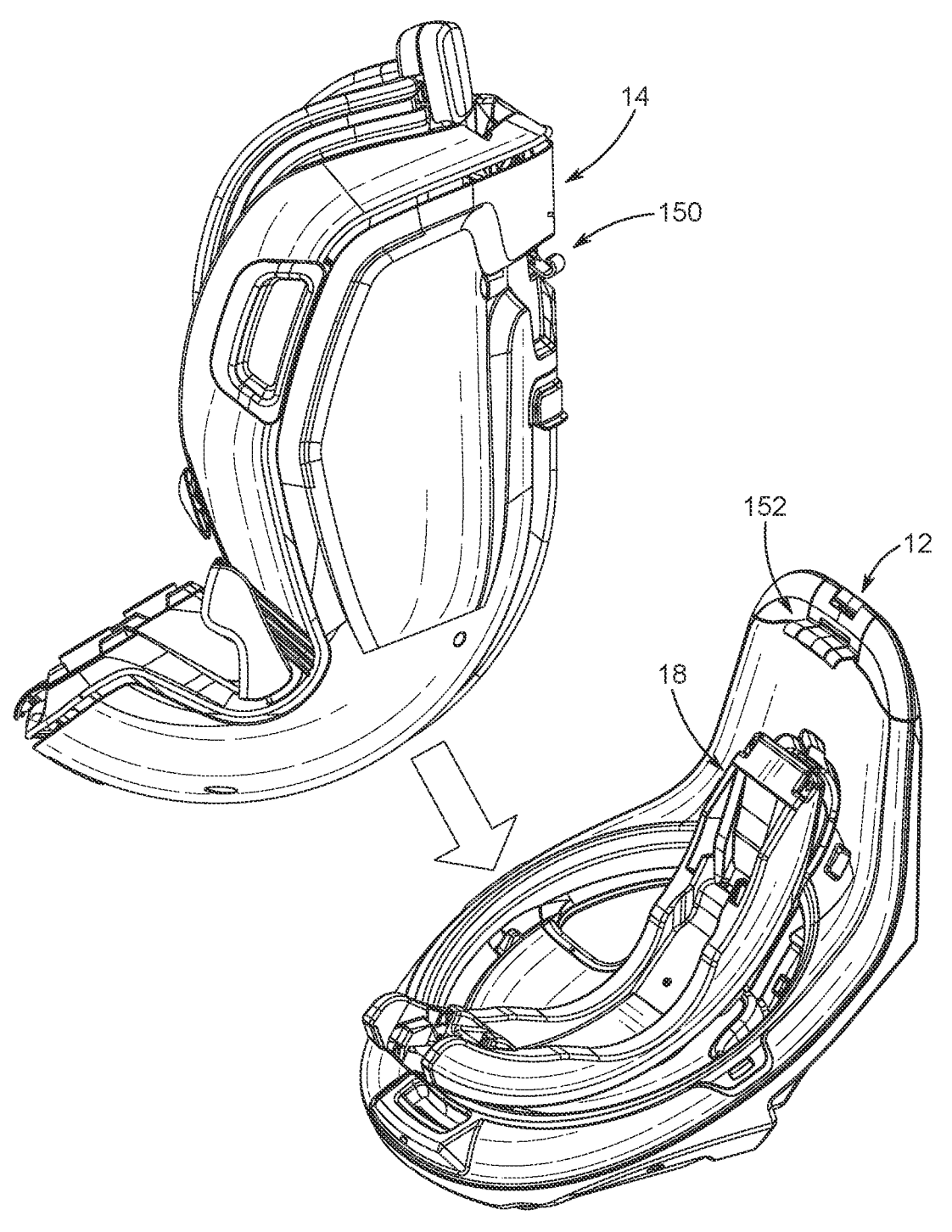
Figure 22:
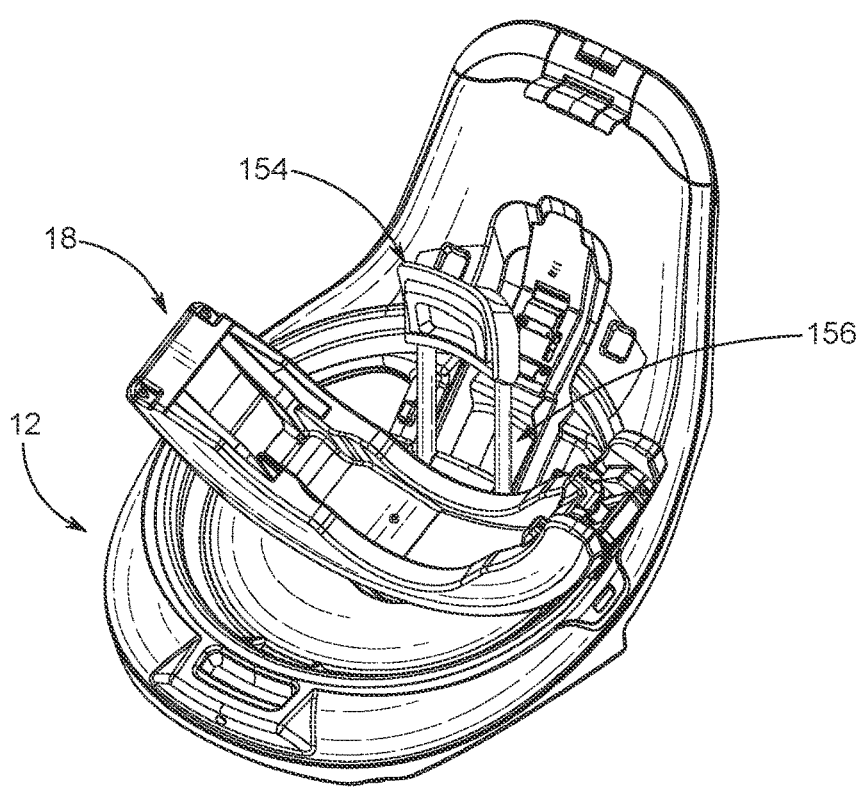
Figure 23:
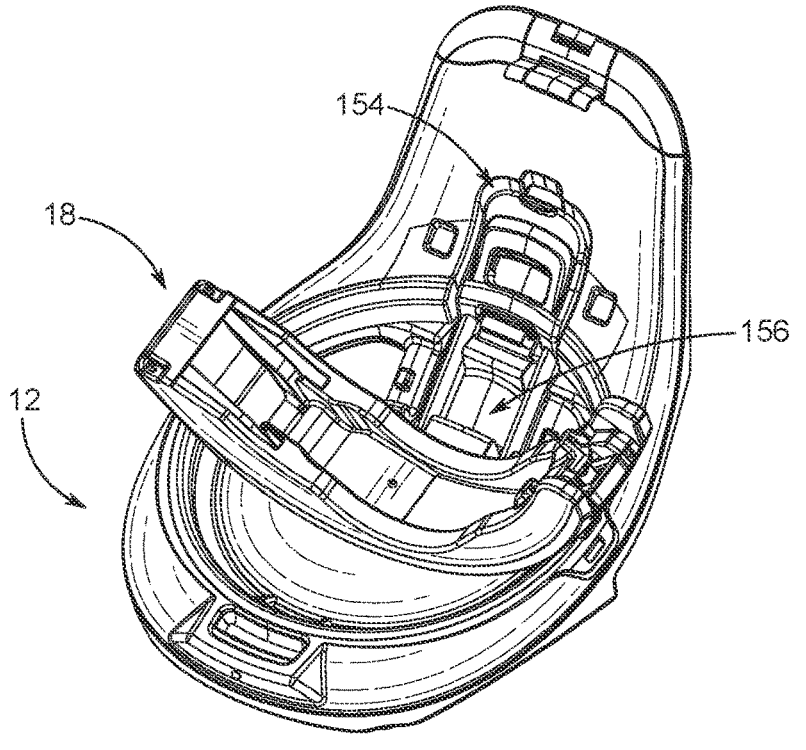

FIG. 4 is a perspective view with portions of the seat-orientation controller separated from the seat-base foundation to show that the seat orientation controller includes a rotation-guide pedestal received within a pedestal-receiving space formed in the seat-base foundation and a juvenile-seat attachment unit coupled to an upper end of the rotation-guide pedestal and used to mount the juvenile seat to the seat base, and further showing that the attachment unit includes an attachment body, a retainer unit coupled to an upper end of the attachment body to mount the juvenile seat to the attachment body, and a seat-motion blocking unit configured to block movement of the juvenile seat relative to the seat-base foundation;

FIG. 5 is an enlarged portion of FIG. 4 showing a rear-end seat motion blocker, included in the seat-motion blocking unit, positioned at a rear end of the attachment body;

FIG. 6 is an enlarged portion of FIG. 4 showing a controller support included in the seat-base foundation and configured to interlock with the rear-end seat-motion blocker to block forward pivoting of the juvenile seat in a forward-facing orientation;

FIG. 7 is an enlarged view of a portion of FIG. 4 showing a front-end seat motion blocker, included in the seat-motion blocking unit, positioned at a front end of the attachment body;

FIG. 8 is an enlarged view of a portion of FIG. 4 showing a juvenile-seat rotation latch, included in the seat-base foundation, and mounted at a front end of the seat-base foundation and configured to engage one of the front-end seat motion blocker and the rear-end seat motion blocker to block the juvenile seat from rotating about the rotation axis;

FIG. 9 is an exploded assembly view of the seat-orientation controller showing that the attachment body of the seat-orientation controller includes a support frame and a juvenile-seat recline unit coupled to the support frame to allow the juvenile seat to change a recline orientation relative to the support frame and the seat-base foundation;

FIG. 10 is another exploded assembly view of the attachment body;

FIG. 11 is a top plan view of portions of the attachment body showing the recline unit unactuated and in a locked state blocking recline of the juvenile seat;

FIG. 12 is a top plan view similar to FIG. 11 showing an actuator handle of the recline unit actuated to change a pair of retractable pins from the locked state to an unlocked state so that the juvenile seat is free to recline relative to the support frame and the seat-base foundation;

FIG. 13 is a perspective view of the seat base showing the recline unit in a first reclined position about a horizontal pivot axis located above the seat-orientation controller;

FIG. 14 is an enlarged view of a portion of FIG. 13 showing that the seat-orientation controller further includes a circumferential motion blocker in an extended position to block rotation of the seat-orientation controller about the vertical rotation axis all the way to the forward-facing orientation until the seat-orientation controller is moved to a predetermined recline position;

FIG. 15 is another perspective view similar to FIG. 13 showing the recline unit in a second reclined position corresponding to the predetermined recline position;

FIG. 16 is an enlarged view of a portion of FIG. 15 showing the circumferential motion blocker in a retracted position after the recline unit has assumed to the second recline position to withdraw the circumferential motion blocker away from a rotation stop fixed to the seat-base foundation;

FIG. 17 is another perspective view similar to FIG. 15 showing the seat-orientation controller rotated to a position corresponding with the forward-facing orientation of the juvenile seat;

FIG. 18 is an enlarged view of a portion of FIG. 17 showing the circumferential motion blocker aligned with the rotation stop after being withdrawn away from the rotation stop so that the seat-orientation controller is free to rotate to the position shown in FIG. 17;

FIG. 19 is a cross section taken along line 19-19 in FIG. 17 showing a latch received in a latch opening to lock the juvenile seat in a selected recline position;

FIG. 20 is another cross section of a portion of the seat base showing a projection coupled to the attachment body and engaged with the circumferential motion blocker to translate the circumferential motion blocker away from the rotation stop in response to the juvenile seat moving to an upright position for the forward-facing orientation;

FIG. 21 is a perspective view showing the juvenile seat separated from the seat base to expose a first juvenile-seat support coupled to the juvenile seat and a second juvenile seat support coupled to the seat-base foundation and configured to interlock with the first juvenile seat support only after being freed to rotate to the forward-facing orientation by adjusting the recline position of the juvenile seat to the position shown in FIG. 17;

FIG. 22 is a perspective view of the seat base showing the seat-orientation controller in a sideways orientation to expose a vehicle seatbelt retainer included in the seat base and pivotable to an unclamped position when the seat-orientation controller is in the sideways orientation; and FIG. 23 is a perspective view similar to FIG. 22 showing the vehicle seatbelt retainer pivoted relative to the seat-base foundation to a clamped position to clamp a vehicle seatbelt to the seat-base foundation.

DETAILED DESCRIPTION

Figure 1:
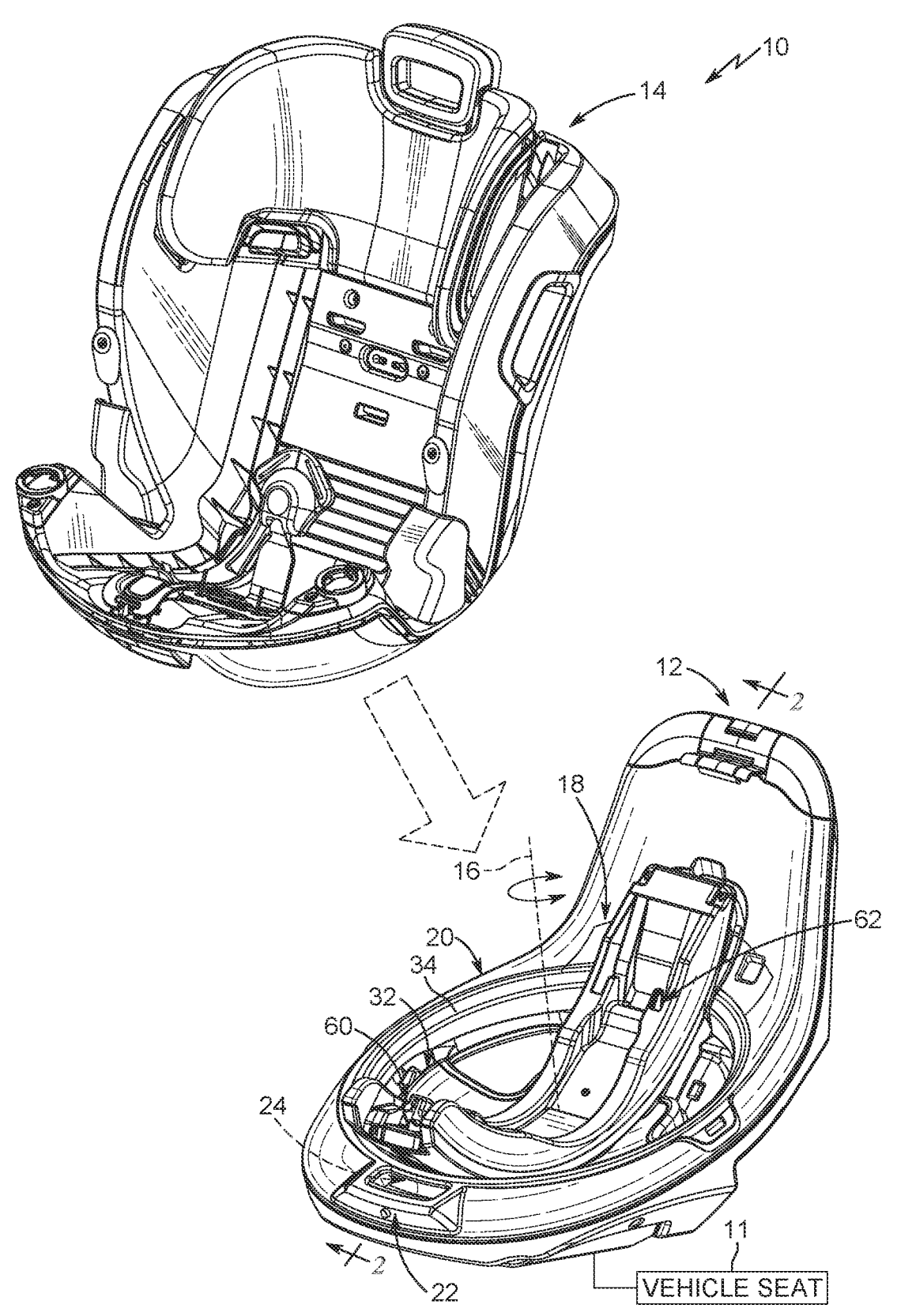

A child restraint 10 includes a seat base 12 adapted to rest on a vehicle seat 11 and a juvenile seat 14 adapted to mount to the seat base 12 to secure the juvenile seat 14 to the vehicle seat 11 as shown in FIG. 1. The juvenile seat 14 is rotatable relative to the seat base 12 about a vertical rotation axis 16 to arrange the juvenile seat 14 in a forward-facing orientation or a rearward-facing orientation. In illustrative embodiments, the child restraint 10 further includes a seat-orientation controller 18 that is configured to mount the juvenile seat 14 to the seat base 12 and control movement of the juvenile seat 14 relative to the seat base. The seat-orientation controller 18 is fixed to the seat base 12 and is rotatable about the vertical rotation axis 16 in unison with the juvenile seat 14 when the juvenile seat 14 is mounted on the seat-orientation controller 18. The seat orientation controller 18 includes features that allow the juvenile seat to rotate and recline relative to the seat base 12.

Figures 2, 3:
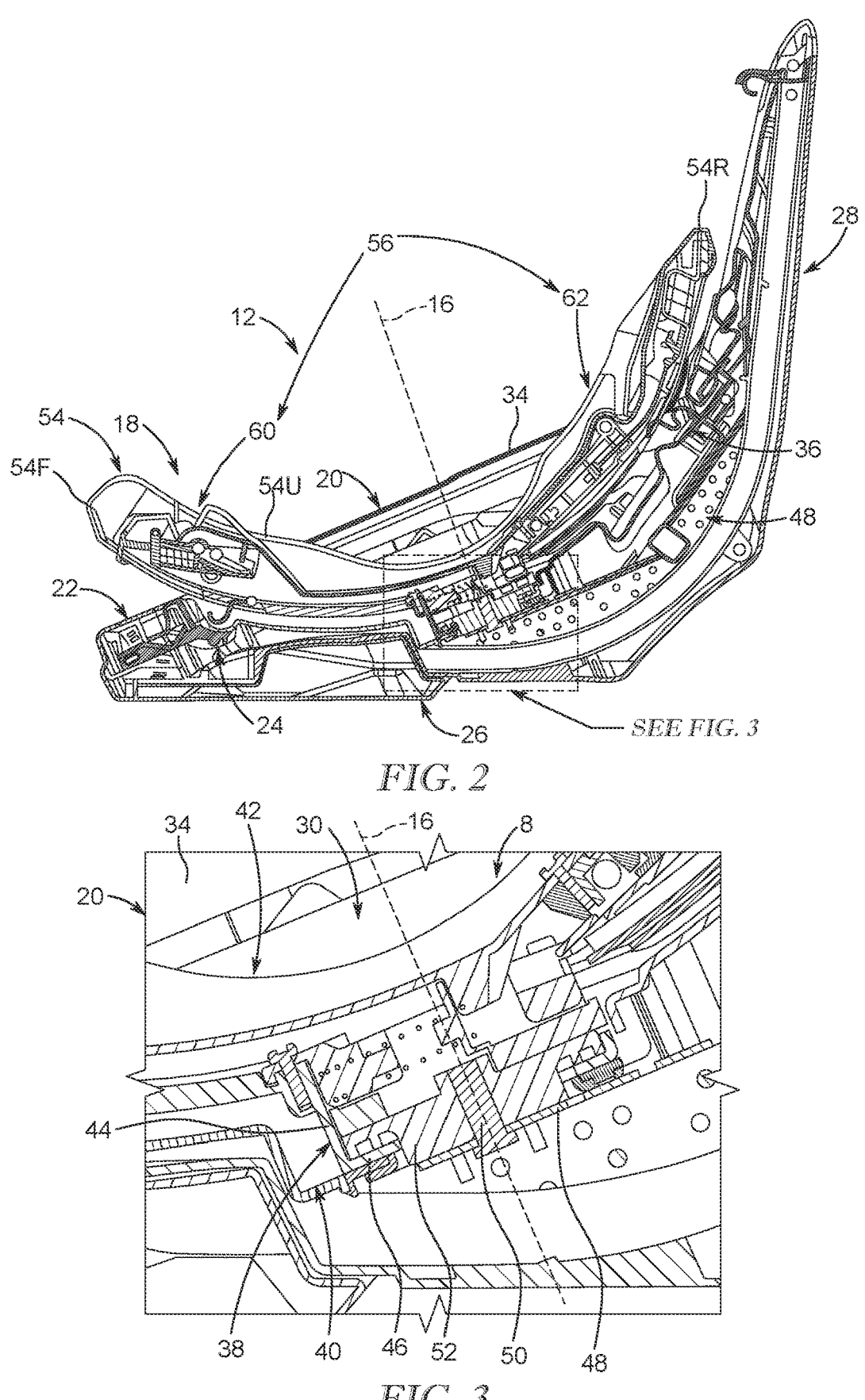
FIG. 2 is a cross section of the seat base taken along line 2-2 in FIG. 1 showing that the seat-orientation controller is mounted to the seat-base foundation for rotation about a rotation axis relative to the seat-base foundation.
FIG. 3 is an enlarged view of a portion of FIG. 2 showing that the seat-orientation controller is mounted to an attachment post to establish the rotation axis of the seat-orientation controller and the juvenile seat.

The seat base 12 includes a seat-base foundation 20, a release handle 22 coupled to the seat-base foundation 20, and a juvenile-seat rotation latch 24 coupled to the release handle 22 to move therewith as shown in FIGS. 1 and 2. The juvenile-seat rotation latch 24 is biased into engagement with the seat-orientation controller 18 to lock the juvenile seat 14 in one of the forward-facing orientation and the rearward-facing orientation.

The seat-base foundation 20 includes a foundation bottom 26 and a foundation backrest 28 coupled to the foundation bottom 26 and arranged to extend upwardly away from the foundation bottom 26 as shown in FIGS. 1 and 2. In some embodiments, the foundation backrest 28 may be omitted. The foundation bottom 26 includes a concave, foundation basin 30 defining a controller-receiving space 32, a perimeter rim 34 coupled to the foundation basin 30, and a controller support 36 coupled to a rear end of the perimeter rim 34. The seat-orientation controller 18 is at least partially received within the controller-receiving space 32. The perimeter rim 34 is coupled to an upper end of the foundation basin 30 and is arranged to extend circumferentially around the foundation basin 30 and the vertical rotation axis 16. The perimeter rim 34 is substantially circular in the illustrative embodiment. The controller support 36 is configured to interact with the seat-orientation controller 18 in both the forward-facing orientation and the rearward-facing orientation to block movement of the seat-orientation controller 18, and the juvenile seat 14 fixed thereto, relative to the seat base-foundation 20.

The seat-orientation controller 18 includes a rotation-guide pedestal 38 received within a pedestal-receiving space 40 formed in the foundation basin 30 and a juvenile-seat attachment unit 42 coupled to the rotation-guide pedestal 38 as shown in FIGS. 2 and 3. The rotation-guide pedestal 38 is generally cylindrical and is arranged along the vertical rotation axis 16. The juvenile seat 14 is configured to attach to the juvenile-seat attachment unit 42 to mount the juvenile seat 14 to the seat base 12.

The rotation-guide pedestal 38 includes a side wall 44 that is substantially parallel to the vertical rotation axis 16 and a retainer ring 46 coupled to a lower end of the side wall 44 and that extends radially inward toward the vertical rotation axis 16 as shown in FIG. 3. The seat-base foundation 20 further includes a rigid support frame 48, an attachment post 50 coupled to the rigid support frame 48, and a bearing disk 52 coupled to the attachment post 50. The attachment post 50 is arranged along and provides the vertical rotation axis 16. The retainer ring 46 is arranged to lie vertically between the bearing disk 52 and an upper surface of the seat-base foundation 20 to block movement of the seat-orientation controller 18 away from the seat-base foundation 20 along the vertical rotation axis 16. The retainer ring 46 is rotatable relative to the bearing disk 52. A plurality of balls (not shown) may be located between the retainer ring 46 and the bearing disk 52 and/or between the retainer ring 46 and the upper surface of the seat-base foundation 20 to reduce friction therebetween.

The juvenile-seat attachment unit 42 includes an attachment body 54, a seat-retainer unit 56 coupled to an upper end 54U of the attachment body 54, and a motion-blocking unit 58 configured to block movement of the seat-orientation controller 18 relative to the seat base 12 when the juvenile seat 14 is in the forward-facing orientation and the rearward-facing orientation. The attachment body 54 has a curved shape and is arranged to lie at least partially within the controller-receiving space 32 and to generally follow the concave shape of the foundation basin 30 defining the controller-receiving space 32. The seat-retainer unit 56 is configured to attach and retain the juvenile seat 14 to the attachment body 54. The motion-blocking unit 58 cooperates with the juvenile-seat retainer latch 24 to block circumferential rotation of the seat-orientation controller 18 relative to the seat base 12. The motion-blocking unit 58 also cooperates with the controller support 36 to block forward pivoting of the seat-orientation controller 18 relative to the seat base 12 during a front impact, for example.

The seat-retainer unit 56 includes a front-end seat retainer 60 and a rear-end retainer 62 as shown in FIGS. 1 and 2. The front-end seat retainer 60 is arranged to lie on the upper end 54U of the attachment body 54 and at a front end 54F of the attachment body 54. The rear-end seat retainer 62 is arranged to lie on the upper end 54U of the attachment body 54 and at a rear end 54R of the attachment body 54. The forward and rear seat retainers 60, 62 are configured to secure the juvenile seat 14 to the juvenile-seat attachment unit 42 and allow separation of the juvenile seat 14 from the juvenile-seat attachment unit 42.

The motion-blocking unit 58 includes a first seat-motion blocker 64 and a second seat-motion blocker 66 as shown in FIGS. 4-8. The first seat-motion blocker 64 is coupled to a lower end 54L of the attachment body 54 at the front end 54F of the attachment body 54. The second seat-motion blocker 66 is coupled to the lower end 54L of the attachment body 54 at the rear end 54R of the attachment body 54. The first seat-motion blocker 64 interlocks with the controller support 36 when the juvenile seat 14 is in the rearward-facing orientation. The first seat-motion blocker 64 also engages and/or interlocks with the juvenile-seat retainer latch 24 when the juvenile seat 14 is in the forward-facing orientation. The second seat-motion blocker 66 interlocks with the controller support 36 when the juvenile seat 14 is in the forward-facing orientation. The second seat-motion blocker 66 also engages and/or interlocks with the juvenile-seat retainer latch 24 when the juvenile seat 14 is in the rearward-facing orientation.

Each of the first and second seat-motion blockers 64, 66 has a J-shaped profile when viewed from the side as shown in FIGS. 5 and 7. The controller support 36 also has a complementary J-shaped profile when viewed from the side as shown in FIG. 6. The controller support 36 is fixed to the rigid support frame 48 of the seat-base foundation 20 to bear loads acting on controller support 36 from one of the seat motion blockers 64, 66.

Each of the seat-motion blockers 64, 66 travel in a blocker pathway 65 which extends circumferentially around axis 16 and below the perimeter rim 34. The juvenile-seat retainer latch 24 and the controller support 36 are each aligned and reside at least partially with the blocker pathway 65. The first and second seat-motion blockers 64, 66 interlock with the controller support 36 and the juvenile-seat retainer latch 24 in both the forward-facing orientation and the rearward-facing orientation. The first and second seat-motion blockers 64, 66 interlock with the controller support 36 by passing under the controller support 36 when the seat-orientation controller 18 reaches the forward-facing orientation and the rearward-facing orientation.

The juvenile-seat retainer latch 24 includes a pair of opposing latch ramps 241, 242 which are inclined circumferentially toward one another. The ramps 241, 242 are biased to extend into the controller-receiving space 32 and are retractable from the controller-receiving space 32 in response to one of the seat-motion blockers 64, 66 impacting one of the ramps 241, 242 as the seat-orientation controller 18 rotates about axis 16. Once one of the seat-motion blockers 64, 66 is arranged to lie between the ramps 241, 242, the seat-orientation controller 18 is blocked from rotating about axis 16 by the ramps 241, 242. The release handle 22 is coupled to both ramps 241, 242 and retracts the ramps 241, 242 from the controller-receiving space 32 when actuated by a user to free the seat-orientation controller 18 to rotate about the axis 16.

The attachment body 54 includes a support frame 68 coupled to the rotation-guide pedestal 38 in a fixed position, and a juvenile-seat recline unit 70 coupled to the support frame 68 as shown in FIG. 9. The support frame 68 is rotatable about the rotation axis 16 but does not pivot or recline relative to the seat base 12. The juvenile-seat recline unit 70 is configured to move relative to the support frame 68 and the seat base 12 about a horizontal pivot axis 72 located above the seat-orientation controller 18 to change the juvenile seat 14 from a first reclined position relative to the seat-base foundation 20 to a second reclined position relative to the seat-base foundation 20. The second reclined position has a different orientation relative to the vertical rotation axis 16 than the first reclined position such that the juvenile seat 14 can adjust a recline angle relative to the rotation axis 16 when the juvenile seat 14 is in the rearward-facing orientation.

The juvenile-seat recline unit 70 includes a movable recline carriage 74 (also called a recline unit), a recline lock 76 coupled to the movable recline carriage 74 for movement therewith, and a recline-lock actuator 78 coupled to the recline lock 76 as shown in FIG. 9. The recline lock 76 is coupled releasably to the support frame 68 so that the movable recline carriage 74 can pivot relative to the support frame 68 when the recline lock 76 is released from the support frame 68. The recline-lock actuator 78 is configured to be engaged by a user to move the recline lock 76 from a locked position to an unlocked position. In the locked position, the recline lock 76 extends between and interconnects the movable recline carriage 74 and the support frame 68 to block movement of the movable recline carriage 74 relative to the support frame 68. In the unlocked position, the recline lock 76 is separated from the support frame 68 and the movable recline carriage 74 and the juvenile seat 14 attached thereto is free to move about the horizontal pivot axis 72 relative to the support frame 68 and the seat base 12.

The recline lock 76 includes a first movable latch 80 and a second movable latch 82 each biased toward the support frame 68 to normally establish the locked position. The movable latches 80, 82 each extend into corresponding latch openings 90, 92 formed in the support frame 68 in the locked position. The recline lock further includes a latch mount 88 that receives guide pins 81, 83 coupled to each respective movable latch 80, 82 to guide translation of the movable latches 80, 82 relative to the latch mount 88 when the recline-lock actuator 78 is engaged. There are a plurality of latch openings 90, 92 in the support frame 68 which each correspond to a different recline position for the juvenile seat 14.

The recline-lock actuator 78 includes an actuator handle 84 configured to be gripped by a user and a latch mover 86 coupled to the actuator handle 84. The latch mover 86 is configured to be moved relative to the recline lock 76 in response to actuation of the actuator handle 84 by the user to change the first and second movable latches from the locked position to the unlocked position.

The latch mover 86 is formed to include a first latch-mover slot 94 that receives a latch guide pin 81 of the first movable latch 80 and a second latch-mover slot 96 that receives a latch guide pin 83 of the second movable latch 82. The first latch-mover slot 94 is arranged to lie at least partially at an angle relative to a direction of travel of the first movable latch 80. The second latch-mover slot 96 is arranged to lie at least partially at an angle relative to a direction of travel of the second movable latch 82. The latch mover 86 is configured to withdraw the first and second movable latches 80, 82 from opposing first and second latch openings 90, 92 formed in the support frame 68 to separate the first and second movable latches 80, 82 from the support frame 68 so that the movable recline carriage 74 is free to pivot about the horizontal pivot axis 72 relative to the support frame 68.

The first and second guide slots 94, 96 are at least partially angled toward one another to cause the first and second movable latches 80, 82 to be withdrawn toward one another. The first and second movable latches 80, 82 move toward one another as the latch mover 86 is actuated.

The movable recline carriage 74 includes a carriage housing 102 surrounding the recline lock 76, the recline-lock actuator 78, and a portion of the support frame 68 as suggested in FIGS. 9 and 10. The movable recline carriage 74 further includes a first recline-lock carrier beam 104 arranged to lie on a first side of latch mover 86 and coupled to the first movable latch 80 and a second recline-lock carrier beam 106 arranged to lie on an opposite, second side of the latch mover 86 and coupled to the second movable latch 82. The carriage housing 102 includes a top cover 108 and a bottom cover 110, both of which are configured to pivot about the horizontal pivot axis 72. The seat-retainer unit 56 including the front-end retainer 60 and the rear-end retainer 62 are both fixed to the first and second recline-lock carrier beams 108, 110 for pivotable movement about the horizontal pivot axis 72 with the carriage housing 102.

The support frame 68 includes a frame base 112, a first support beam 114 coupled to the frame base 112 and to a first side of the juvenile-seat recline unit 70, and a second support beam 116 coupled to the frame base 112 and an opposite, second side of the juvenile-seat recline unit 70. The first and second seat motion blockers 64, 66 are fixed to the frame base 112 and extend downwardly therefrom. The first support beam 114 and the second support beam 116 extend longitudinally along an entire length of the frame base 112 and extend upwardly therefrom.

The frame base 112 includes a curved base plate 118 coupled to both the first and the second support beams 114, 116 and the rotation-guide pedestal 38 that extends downwardly from the curved base plate 118 and that is secured to the seat base 12 to establish the vertical rotation axis 16. The first support beam 114 and the second support beam 116 are each formed to include a first guide slot 120 and a second guide slot 122 spaced apart from the first guide slot 120. The juvenile-seat recline unit 70 further includes a first guide pin 124 that extends through the first guide slot 120 formed in both of the first and second support beams 114, 116 and a second guide pin 126 that extends through the second guide slot 122 formed in both of the first and second support beams 114, 116. The first support beam 114 and the second support beam 116 are each formed to include the plurality of latch openings 90, 92 between the first and second guide slots 120, 122.

The bottom cover 110 of the carriage housing 102 is formed to include a pedestal-receiving opening 128 as shown in FIG. 9. The carriage housing 102 is configured to move relative to the rotation-guide pedestal 38 between the first reclined position and the second recline position such that a first end 130 of the pedestal-receiving opening 128 is closer to the rotation-guide pedestal 38 in the first reclined position and an opposite, second end 132 of the pedestal-receiving opening 128 is closer to the rotation-guide pedestal 38 in the second reclined position than the first end 130. Seat motion-blockers 64, 66 are also received in corresponding openings 134, 136 formed in the bottom cover 110 of the carriage housing 102.

The seat-orientation controller 18 further includes a circumferential motion blocker 140 that is configured to block rotation of the seat-orientation controller 18 about the vertical rotation axis 16 all the way to the forward-facing orientation until the seat-orientation controller 18 is moved to a predetermined recline position as suggested in FIGS. 13-18. The circumferential motion blocker 140 is received in the pedestal-receiving space 40 and is movable between an extended position, as shown in FIG. 14, and a retracted position, as shown in FIG. 16, depending on the recline position of the seat-orientation controller 18. The circumferential motion blocker 140 is configured to slide relative to the seat base 12 and the support frame 68 between the extended position and the retracted position as shown in FIGS. 14 and 16.

In the extended position, the circumferential motion blocker 140 protrudes into a travel path 140P positioned radially outward from the rotation guide pedestal 38 relative to the vertical rotation axis 18. The seat base 12 includes a rotation stop 142 that is fixed in position relative to the seat-orientation controller 18 and that extends into the travel path 140P from a rear end of the pedestal-receiving space 40. The circumferential motion blocker 140 will engage the rotation stop 142 if the seat-orientation controller 18 attempts to rotate to the forward-facing orientation when the circumferential motion blocker 140 is in the extended position as suggested in FIG. 14.

A portion of the juvenile-seat recline unit 70 is configured to engage and move the circumferential motion blocker 140 from the extended position to the retracted position in response to changing the recline position of the seat-orientation controller 18 as suggested in FIGS. 13-16. In the retracted position, the circumferential motion blocker 140 is withdrawn from the travel path 140P as shown in FIG. 16. Once withdrawn from the travel path 140P, the circumferential motion blocker 140 is free to rotate past the rotation stop 142 and the seat-orientation controller 18 can assume the forward-facing orientation as shown in FIGS. 17 and 18.

The circumferential motion blocker 140 is biased to the extended position by a spring 144 as shown in FIGS. 14 and 16. The juvenile-seat recline unit 70 further includes a motion-blocker mover 146. The motion-blocker mover 146 is coupled to the recline carriage 74 and extends toward the circumferential motion blocker 140. The motion-blocker mover 146 is configured to engage an upwardly-extending lip 148 of the circumferential motion blocker 140 when the seat-orientation controller 18 is moved to an upright position as shown in FIGS. 17, 19, and 20. In the upright position, the latches 80, 82 are received in lowermost/forwardmost openings of the plurality of openings 90, 92 and the circumferential motion blocker 140 is moved by the motion-blocker mover 146 to the retracted position. In some embodiments, once the juvenile seat 14 assumes the upright position and is rotated to the forward-facing orientation, the actuator handle 84 can be reengaged by a user to adjust the recline position of the juvenile seat 14.

The circumferential motion blocker 140 blocks a user from rotating the juvenile seat 14 to the forward-facing orientation until the juvenile seat 14 is in the fully reclined position. The juvenile seat 14 includes a first juvenile-seat support 150 coupled to a backside thereof as shown in FIG. 21. The juvenile seat support 150 is configured to interlock with a corresponding second juvenile-seat support 152 when the juvenile seat 14 is in the forward-facing orientation. The second juvenile-seat support 152 pivots with the juvenile seat 14 when the seat-orientation controller 18 recline position is changed. Thus, the circumferential motion blocker 140 ensures the first juvenile seat support 150 is at a correct position to interlock with the second juvenile-seat support 152 before reaching the forward-facing orientation.

The child restraint 10 further includes a seat belt retainer 154 that is mounted to the seat base 12 and that is configured to pivot relative to the seat base 12 to open and close a beltpath 156 for a vehicle seat belt as shown in FIGS. 22 and 23. The seat belt retainer 154 may only be pivoted to an opened position as shown in FIG. 22 when the seat-orientation controller 18 is in a sideways facing arrangement. The seat belt retainer 154 may also only be pivoted to the opened position when the juvenile seat is removed from the seat-orientation controller 18. This may help ensure that the seat base 12 is properly secured to a vehicle seat 11 prior to full installation of the juvenile seat 14. Once the belt retainer 154 is moved to a closed position as shown in FIG. 23, the seat orientation controller is free to rotate about the vertical rotation axis 16. The seat orientation controller 18 may help retain the seat belt retainer 154 in the forward-facing and rearward-facing orientations.

The following numbered clauses include embodiments that are contemplated and non-limiting:

Clause 1. A child restraint includes a juvenile seat adapted to support a child in a vehicle.

Clause 2. The child restraint of clause 1, any other clause, or any suitable combination of clauses, further including a seat base adapted to rest on a vehicle seat.

Clause 3. The child restraint of clause 2, any other clause, or any suitable combination of clauses, further including a seat-orientation controller fixed to the seat base for movement therewith and relative thereto about a vertical rotation axis, the seat-orientation controller includes a support frame coupled to the seat base and a juvenile-seat recline unit coupled to the support frame and configured to move relative to the support frame and the seat base about a horizontal pivot axis to change the juvenile seat from a first reclined position relative to the seat base to a second reclined position relative to the seat base, the second reclined position having a different orientation relative to the vertical rotation axis than the first reclined position.

Clause 4. The child restraint of clause 3, any other clause, or any suitable combination of clauses, wherein the juvenile-seat recline unit includes a movable recline carriage, a recline lock coupled to the movable recline carriage for movement therewith and coupled releasably to the support frame, and a recline-lock actuator coupled to the recline lock and configured to move the recline lock from a locked position, in which the recline lock extends between and interconnects the movable recline carriage and the support frame to block movement of the movable recline carriage relative to the support frame, and an unlocked position, in which the recline lock is separated from the support frame and the movable recline carriage is free to move about the horizontal pivot axis relative to the support frame.

Clause 5. The child restraint of clause 4, any other clause, or any suitable combination of clauses, wherein the recline lock includes a first movable latch and a second movable latch each biased toward the locked position, and the recline-lock actuator includes an actuator handle configured to be gripped by a user and a latch mover coupled to the actuator handle and configured to be actuated by the user to change the first and second movable latches from the locked position to the unlocked position.

Clause 6. The child restraint of clause 5, any other clause, or any suitable combination of clauses, wherein the latch mover is formed to include a first latch-mover slot that receives a portion of the first movable latch and a second latch-mover slot that receives a portion of the second movable latch.

Clause 7. The child restraint of clause 6, any other clause, or any suitable combination of clauses, wherein the first latch-mover slot is arranged to lie at least partially at an angle relative to a direction of travel of the first movable latch and the second latch-mover slot is arranged to lie at least partially at an angle relative to a direction of travel of the second movable latch such that the latch mover is configured to withdraw the first and second movable latches from opposing first and second latch openings formed in the support frame to separate the first and second movable latches from the support frame so that the movable recline carriage is free to pivot about the horizontal pivot axis relative to the support frame.

Clause 8. The child restraint of clause 4, any other clause, or any suitable combination of clauses, wherein the recline lock includes a first movable latch that is biased toward the locked position and the recline-lock actuator includes an actuator handle configured to be gripped and actuated by a user and a latch mover coupled to the actuator handle and formed to include a first latch-mover slot that receives a portion of the first movable latch, at least a portion of the first latch-mover slot is arranged to lie at an angle relative to a direction of travel of the recline lock such that the latch mover is configured to withdraw the first movable latch from a first latch opening formed in the support frame to separate the first movable latch from the support frame so that the movable recline carriage is free to move relative to the support frame.

Clause 9. The child restraint of clause 8, any other clause, or any suitable combination of clauses, wherein the recline lock further includes a second movable latch that is biased toward the locked position and the latch mover is formed to include a second latch-mover slot that receives a portion of the second movable latch, at least a portion of the second latch-mover slot is arranged to lie at an angle relative to the direction of travel of the recline lock different than the angle of the first latch-mover slot such that the latch mover is configured to withdraw simultaneously the first movable latch from the first latch opening and the second movable latch from a second latch opening formed in the support frame to separate the first and second movable latches from the support frame so that the movable recline carriage is free to move relative to the support frame.

Clause 10. The child restraint of clause 9, any other clause, or any suitable combination of clauses, wherein the first and second movable latches move toward one another as the latch mover is actuated.

Clause 11. The child restraint of clause 9, any other clause, or any suitable combination of clauses, wherein the movable recline carriage includes a carriage housing surrounding the support frame, the recline lock, and the recline-lock actuator, a first recline-lock carrier beam arranged to lie on a first side of latch mover and coupled to the first movable latch, and a second recline-lock carrier beam arranged to lie on an opposite, second side of the latch mover and coupled to the second movable latch.

Clause 12. The child restraint of clause 3, any other clause, or any suitable combination of clauses, wherein the support frame includes a frame base, a first support beam coupled to the frame base and to a first side of the juvenile-seat recline unit, and a second support beam coupled to the frame base and the an opposite, second side of the juvenile-seat recline unit.

Clause 13. The child restraint of clause 12, any other clause, or any suitable combination of clauses, wherein the frame base includes a curved base plate coupled to both the first and the second support beams and a rotation-guide pedestal that extends downwardly from the curved base plate and that is secured to the seat base to establish the vertical rotation axis.

Clause 14. The child restraint of clause 13, any other clause, or any suitable combination of clauses, wherein the carriage housing is formed to include a pedestal-receiving opening and the carriage housing is configured to move relative to the rotation-guide pedestal between the first reclined position and the second recline position such that a first end of the pedestal-receiving opening is closer to the rotation-guide pedestal in the first reclined position and an opposite, second end of the pedestal-receiving opening is closer to the rotation-guide pedestal in the second reclined position than the first end.

Clause 15. The child restraint of clause 12, any other clause, or any suitable combination of clauses, wherein the first support beam and the second support beam are each formed to include a first guide slot.

Clause 16. The child restraint of clause 15, any other clause, or any suitable combination of clauses, wherein the first support beam and the second support beam are each formed to include a second guide slot spaced apart from the first guide slot.

Clause 17. The child restraint of clause 16, any other clause, or any suitable combination of clauses, wherein the juvenile-seat recline unit further includes a first guide pin that extends through the first guide slot formed in both of the first and second support beams and a second guide pin that extends through the second guide slot formed in both of the first and second support beams.

Clause 18. The child restraint of clause 17, any other clause, or any suitable combination of clauses, wherein the first support beam and the second support beam are each formed to include a plurality of latch openings between the first and second guide slots.

Clause 19. The child restraint of clause 18, any other clause, or any suitable combination of clauses, wherein the juvenile-seat recline unit includes the recline lock having a first movable latch and a second movable latch each biased toward the locked position, the first movable latch is received in one of the plurality of latch openings formed in the first support beam and the second movable latch received in one of the plurality of latch opening formed in the second support beam.

Clause 20. The child restraint of clause 3, any other clause, or any suitable combination of clauses, wherein the seat-orientation controller further includes a seat-retainer unit coupled to the juvenile-seat recline unit and configured to attach removably the juvenile seat to the seat base and a motion-blocking unit coupled to the support frame and configured to block movement of the seat-orientation controller relative to the seat base when the juvenile seat is in the forward-facing orientation and the rearward-facing orientation.

Clause 21. The child restraint of clause 20, any other clause, or any suitable combination of clauses, wherein the juvenile-seat retainer unit includes a first juvenile-seat retainer coupled to a front end of the juvenile-seat recline unit and a second juvenile-seat retainer coupled to a rear end of the juvenile-seat recline unit, the first and second juvenile-seat retainers are configured to engage the juvenile seat to retain the juvenile seat to the seat-orientation controller and the first and second juvenile-seat retainers are movable relative to the seat base from the first reclined position to the second reclined position.

Clause 22. The child restraint of clause 21, any other clause, or any suitable combination of clauses, wherein the motion-blocking unit includes a first seat-motion blocker coupled to a front end of the support frame and a second seat-motion blocker coupled to a rearward end of the support frame.

Clause 23. The child restraint of clause 22, any other clause, or any suitable combination of clauses, wherein the first seat-motion blocker interlocks with a controller support fixed to the seat base when the juvenile seat is in the rearward-facing orientation and the second seat-motion blocker interlocks with the controller support when the juvenile seat is in the forward-facing orientation.

Clause 24. A child restraint includes a juvenile seat adapted to support a child in a vehicle and a seat base adapted to rest on a vehicle seat.

Clause 25. The child restraint of clause 24, any other clause, or any suitable combination of clauses, further including a seat-orientation controller fixed to the seat base and configured to mount the juvenile seat to the seat base.

Clause 26. The child restraint of clause 25, any other clause, or any suitable combination of clauses, wherein the seat base includes a seat base foundation, a release handle coupled to the seat-base foundation, and a juvenile-seat rotation latch coupled to the release handle to move therewith.

Clause 27. The child restraint of clause 26, any other clause, or any suitable combination of clauses, wherein the juvenile seat and the seat-orientation controller are rotatable in unison relative to the seat-base foundation about a vertical rotation axis to arrange the juvenile seat in a forward-facing orientation or a rearward-facing orientation and the juvenile-seat rotation latch is biased into engagement with the seat-orientation controller to lock the juvenile seat in one of the forward-facing orientation and the rearward-facing orientation.

Clause 28. The child restraint of clause 27, any other clause, or any suitable combination of clauses, wherein the seat-base foundation includes a foundation bottom and a foundation backrest coupled to the foundation bottom and arranged to extend upwardly away from the foundation bottom.

Clause 29. The child restraint of clause 28, any other clause, or any suitable combination of clauses, wherein the foundation bottom includes a concave, foundation basin defining a mount-receiving space in which the seat-orientation controller is received, a perimeter rim coupled to an upper end of the concave foundation basin and arranged to extend circumferentially around the concave foundation basin and the vertical rotation axis, and a controller support coupled to a rear end of the perimeter rim and configured to interact with the seat-orientation controller in both the forward-facing orientation and the rearward-facing orientation to block movement of the seat-orientation controller relative to the seat base-foundation.

Clause 30. The child restraint of clause 29, any other clause, or any suitable combination of clauses, wherein the seat-orientation controller includes a rotation-guide pedestal received within a pedestal-receiving space formed in the concave foundation basin and a juvenile-seat attachment unit coupled to the rotation-guide pedestal and configured to attach to the juvenile seat to mount the juvenile seat to the seat base.

Clause 31. The child restraint of clause 30, any other clause, or any suitable combination of clauses, wherein the juvenile-seat attachment unit includes an attachment body, a seat-retainer unit coupled to an upper end of the attachment body and configured to attach the juvenile seat to the attachment body, and a motion-blocking unit configured to block movement of the seat-orientation controller relative to the seat base when the juvenile seat is in the forward-facing orientation and the rearward-facing orientation.

Clause 32. The child restraint of clause 31, any other clause, or any suitable combination of clauses, wherein the seat-retainer unit includes a front-end seat retainer arranged to lie on an upper side of the attachment body and at a front end of the attachment body and a rear seat retainer arranged to lie on the upper side the attachment body and at a rearward end of the attachment body, the forward and rear seat retainers are configured to secure the juvenile seat to the juvenile-seat attachment unit and allow separation of the juvenile seat from the juvenile-seat attachment unit.

Clause 33. The child restraint of clause 31, any other clause, or any suitable combination of clauses, wherein the motion-blocking unit includes a first seat-motion blocker coupled to a front end of the attachment body and a second seat-motion blocker coupled to a rearward end of the attachment body.

Clause 34. The child restraint of clause 33, any other clause, or any suitable combination of clauses, wherein the first seat-motion blocker interlocks with the controller support when the juvenile seat is in the rearward-facing orientation and the second seat-motion blocker interlocks with the controller support when the juvenile seat is in the forward-facing orientation.

Clause 35. The child restraint of clause 28, any other clause, or any suitable combination of clauses, wherein the seat-orientation controller includes a motion-blocking unit having a first seat-motion blocker coupled to the front end of the seat-orientation controller and a second seat-motion blocker coupled to the rearward end of the seat-orientation controller.

Clause 36. The child restraint of clause 35, any other clause, or any suitable combination of clauses, wherein the first seat-motion blocker interlocks with a controller support fixed to the seat-base foundation when the juvenile seat is in the rearward-facing orientation and the second seat-motion blocker interlocks with the controller support when the juvenile seat is in the forward-facing orientation.

Clause 37. The child restraint of clause 27, any other clause, or any suitable combination of clauses, wherein the seat-orientation controller includes a rotation-guide pedestal secured to the seat-base foundation to establish the vertical rotation axis and an attachment body coupled to the rotation-guide pedestal and configured to support the juvenile seat.

Clause 38. The child restraint of clause 37, any other clause, or any suitable combination of clauses, wherein the attachment body includes a support frame coupled to the rotation-guide pedestal in a fixed position, and a juvenile-seat recline unit coupled to the support frame and configured to move relative to the support frame about a horizontal pivot axis to change the juvenile seat from a first reclined position relative to the seat-base foundation to a second reclined position relative to the seat-base foundation, the second reclined position having a different orientation relative to the vertical rotation axis than the first reclined position.

Clause 39. The child restraint of clause 38, any other clause, or any suitable combination of clauses, wherein the juvenile-seat recline unit includes a movable recline carriage (unit), a recline lock coupled to the movable recline carriage for movement therewith and coupled releasably to the support frame, and a recline-lock actuator coupled to the recline lock and configured to move the recline lock from a locked position, in which the recline lock extends between and interconnects the movable recline carriage and the support frame to block movement of the movable recline carriage relative to the support frame, and an unlocked position, in which the recline lock is separated from the support frame and the movable recline carriage is free to move about the horizontal pivot axis relative to the support frame.

Clause 40. The child restraint of clause 39, any other clause, or any suitable combination of clauses, wherein the recline lock includes a first movable latch and a second movable latch each biased toward the locked position, and the recline-lock actuator includes an actuator handle configured to be gripped by a user and a latch mover coupled to the actuator handle and configured to be actuated by the user to change the first and second movable latches from the locked position to the unlocked position.

Clause 41. The child restraint of clause 40, any other clause, or any suitable combination of clauses, wherein the latch mover is formed to include a first guide slot that receives a portion of the first movable latch and a second guide slot that receives a portion of the second movable latch.

Clause 42. The child restraint of clause 41, any other clause, or any suitable combination of clauses, wherein the first guide slot is arranged to lie at least partially at an angle relative to a direction of travel of the first movable latch and the second guide slot is arranged to lie at least partially at an angle relative to a direction of travel of the second movable latch such that the latch mover is configured to withdraw the first and second movable latches from opposing first and second latch openings formed in the support frame to separate the first and second movable latches from the support frame so that the movable recline carriage is free to pivot about the horizontal pivot axis relative to the support frame.

Clause 43. The child restraint of clause 42, any other clause, or any suitable combination of clauses, wherein the first and second guide slots are at least partially angled toward one another to cause the first and second movable latches to be withdrawn toward one another.

Clause 44. A child restraint includes a juvenile seat adapted to support a child in a vehicle, a seat base adapted to rest on a vehicle seat, and a seat-orientation controller fixed to the seat base for movement therewith and relative thereto.

Clause 45. The child restraint of clause 44, any other clause, or any suitable combination of clauses, wherein the seat-orientation controller includes a support frame coupled to the seat base and a juvenile-seat recline unit coupled to the support frame and configured to move relative to the support frame and the seat base about a horizontal pivot axis to change the juvenile seat from a first reclined position relative to the seat base to a second reclined position relative to the seat base, the second reclined position having a different orientation relative to the seat base than the first reclined position.

Clause 46. The child restraint of clause 45, any other clause, or any suitable combination of clauses, wherein the juvenile-seat recline unit includes a movable recline carriage, a recline lock coupled to the movable recline carriage for movement therewith and coupled releasably to the support frame, and a recline-lock actuator coupled to the recline lock and configured to move the recline lock from a locked position, in which the recline lock extends between and interconnects the movable recline carriage and the support frame to block movement of the movable recline carriage relative to the support frame, and an unlocked position, in which the recline lock is separated from the support frame and the movable recline carriage is free to move about the horizontal pivot axis relative to the support frame.

Clause 47. The child restraint of clause 46, any other clause, or any suitable combination of clauses, wherein the recline lock includes a first movable latch and a second movable latch each biased toward the locked position, and the recline-lock actuator includes an actuator handle configured to be gripped by a user and a latch mover coupled to the actuator handle and configured to be actuated by the user to change the first and second movable latches from the locked position to the unlocked position.

Clause 48. The child restraint of clause 47, any other clause, or any suitable combination of clauses, wherein the latch mover is formed to include a first latch-mover slot that receives a portion of the first movable latch and a second latch-mover slot that receives a portion of the second movable latch.

Clause 49. The child restraint of clause 48, any other clause, or any suitable combination of clauses, wherein the first latch-mover slot is arranged to lie at least partially at an angle relative to a direction of travel of the first movable latch and the second latch-mover slot is arranged to lie at least partially at an angle relative to a direction of travel of the second movable latch such that the latch mover is configured to withdraw the first and second movable latches from opposing first and second latch openings formed in the support frame to separate the first and second movable latches from the support frame so that the movable recline carriage is free to pivot about the horizontal pivot axis relative to the support frame.

Clause 50. The child restraint of clause 46, any other clause, or any suitable combination of clauses, wherein the recline lock includes a first movable latch that is biased toward the locked position and the recline-lock actuator includes an actuator handle configured to be gripped and actuated by a user and a latch mover coupled to the actuator handle and formed to include a first latch-mover slot that receives a portion of the first movable latch, at least a portion of the first latch-mover slot is arranged to lie at an angle relative to a direction of travel of the recline lock such that the latch mover is configured to withdraw the first movable latch from a first latch opening formed in the support frame to separate the first movable latch from the support frame so that the movable recline carriage is free to move relative to the support frame.

Clause 51. The child restraint of clause 50, any other clause, or any suitable combination of clauses, wherein the recline lock further includes a second movable latch that is biased toward the locked position and the latch mover is formed to include a second latch-mover slot that receives a portion of the second movable latch, at least a portion of the second latch-mover slot is arranged to lie at an angle relative to the direction of travel of the recline lock different than the angle of the first latch-mover slot such that the latch mover is configured to withdraw simultaneously the first movable latch from the first latch opening and the second movable latch from a second latch opening formed in the support frame to separate the first and second movable latches from the support frame so that the movable recline carriage is free to move relative to the support frame.

Clause 52. The child restraint of clause 51, any other clause, or any suitable combination of clauses, wherein the first and second movable latches move toward one another as the latch mover is actuated.

Clause 53. The child restraint of clause 51, any other clause, or any suitable combination of clauses, wherein the movable recline carriage includes a carriage housing surrounding the support frame, the recline lock, and the recline-lock actuator, a first recline-lock carrier beam arranged to lie on a first side of latch mover and coupled to the first movable latch, and a second recline-lock carrier beam arranged to lie on an opposite, second side of the latch mover and coupled to the second movable latch.

Clause 54. The child restraint of clause 45, any other clause, or any suitable combination of clauses, wherein the support frame includes a frame base, a first support beam coupled to the frame base and to a first side of the juvenile-seat recline unit, and a second support beam coupled to the frame base and the an opposite, second side of the juvenile-seat recline unit.

Clause 55. The child restraint of clause 54, any other clause, or any suitable combination of clauses, wherein the first support beam and the second support beam are each formed to include a first guide slot.

Clause 56. The child restraint of clause 55, any other clause, or any suitable combination of clauses, wherein the first support beam and the second support beam are each formed to include a second guide slot spaced apart from the first guide slot.

Clause 57. The child restraint of clause 56, any other clause, or any suitable combination of clauses, wherein the juvenile-seat recline unit further includes a first guide pin that extends through the first guide slot formed in both of the first and second support beams and a second guide pin that extends through the second guide slot formed in both of the first and second support beams.

Clause 58. The child restraint of clause 57, any other clause, or any suitable combination of clauses, wherein the first support beam and the second support beam are each formed to include a plurality of latch openings between the first and second guide slots.

Clause 59. The child restraint of clause 58, any other clause, or any suitable combination of clauses, wherein the juvenile-seat recline unit includes the recline lock having a first movable latch and a second movable latch each biased toward the locked position, the first movable latch is received in one of the plurality of latch openings formed in the first support beam and the second movable latch received in one of the plurality of latch opening formed in the second support beam.

The invention claimed is:

1. A child restraint comprising
a juvenile seat adapted to support a child in a vehicle,
a seat base adapted to rest on a vehicle seat, and
a seat-orientation controller fixed to the seat base for movement therewith and relative thereto about a vertical rotation axis and configured to mount the juvenile seat to the seat base for rotation about the vertical rotation axis with the seat-orientation controller, the seat-orientation controller includes a support frame coupled to the seat base and a juvenile-seat recline unit coupled to the support frame and configured to move relative to the support frame and the seat base about a horizontal pivot axis to change the juvenile seat from a first reclined position relative to the seat base to a second reclined position relative to the seat base, the second reclined position having a different orientation relative to the vertical rotation axis than the first reclined position, wherein the juvenile-seat recline unit includes a movable recline carriage, a recline lock coupled to the movable recline carriage for movement therewith and coupled releasably to the support frame, and a recline-lock actuator coupled to the recline lock and configured to move the recline lock from a locked position, in which the recline lock extends between and interconnects the movable recline carriage and the support frame to block movement of the movable recline carriage relative to the support frame, and an unlocked position, in which the recline lock is separated from the support frame and the movable recline carriage is free to move about the horizontal pivot axis relative to the support frame, and wherein the recline lock includes a first movable latch and a second movable latch each biased toward the locked position, and the recline-lock actuator includes an actuator handle configured to be gripped by a user and a latch mover coupled to the actuator handle and configured to be actuated by the user to change the first and second movable latches from the locked position to the unlocked position.

2. The child restraint of claim 1, wherein the latch mover is formed to include a first latch-mover slot that receives a portion of the first movable latch and a second latch-mover slot that receives a portion of the second movable latch.

3. The child restraint of claim 2, wherein the first latch-mover slot is arranged to lie at least partially at an angle relative to a direction of travel of the first movable latch and the second latch-mover slot is arranged to lie at least partially at an angle relative to a direction of travel of the second movable latch such that the latch mover is configured to withdraw the first and second movable latches from opposing first and second latch openings formed in the support frame to separate the first and second movable latches from the support frame so that the movable recline carriage is free to pivot about the horizontal pivot axis relative to the support frame.

4. The child restraint of claim 1, wherein the support frame includes a frame base, a first support beam coupled to the frame base and to a first side of the juvenile-seat recline unit, and a second support beam coupled to the frame base and an opposite, second side of the juvenile-seat recline unit.

5. The child restraint of claim 4, wherein the frame base includes a curved base plate coupled to both the first and the second support beams and a rotation-guide pedestal that extends downwardly from the curved base plate and that is secured to the seat base to establish the vertical rotation axis.

6. The child restraint of claim 5, wherein the seat recline unit includes a carriage housing that is formed to include a pedestal-receiving opening, and the carriage housing is configured to move relative to the rotation-guide pedestal between the first reclined position and the second reclined position such that a first end of the pedestal-receiving opening is closer to the rotation-guide pedestal in the first reclined position and an opposite, second end of the pedestal-receiving opening is closer to the rotation-guide pedestal in the second reclined position than the first end.

7. The child restraint of claim 4, wherein the first support beam and the second support beam are each formed to include a first guide slot.

8. The child restraint of claim 1, wherein the seat-orientation controller further includes a seat-retainer unit coupled to the juvenile-seat recline unit and configured to attach removably the juvenile seat to the seat base and a motion-blocking unit coupled to the support frame and configured to block movement of the seat-orientation controller relative to the seat base when the juvenile seat is in a forward-facing orientation and a rearward-facing orientation.

9. The child restraint of claim 8, wherein the seat-retainer unit includes a first juvenile-seat retainer coupled to a front end of the juvenile-seat recline unit and a second juvenile-seat retainer coupled to a rear end of the juvenile-seat recline unit, the first and second juvenile-seat retainers are configured to engage the juvenile seat to retain the juvenile seat to the seat-orientation controller and the first and second juvenile-seat retainers are movable relative to the seat base from the first reclined position to the second reclined position.

10. The child restraint of claim 9, wherein the motion-blocking unit includes a first seat-motion blocker coupled to a front end of the support frame and a second seat-motion blocker coupled to a rearward end of the support frame, and wherein the first seat-motion blocker interlocks with a controller support fixed to the seat base when the juvenile seat is in the rearward-facing orientation and the second seat-motion blocker interlocks with the controller support when the juvenile seat is in the forward-facing orientation.

11. A child restraint comprising a juvenile seat adapted to support a child in a vehicle, a seat base adapted to rest on a vehicle seat, and a seat-orientation controller fixed to the seat base for movement therewith and relative thereto about a vertical rotation axis and configured to mount the juvenile seat to the seat base for rotation about the vertical rotation axis with the seat-orientation controller, the seat-orientation controller includes a support frame coupled to the seat base and a juvenile-seat recline unit coupled to the support frame and configured to move relative to the support frame and the seat base about a horizontal pivot axis to change the juvenile seat from a first reclined position relative to the seat base to a second reclined position relative to the seat base, the second reclined position having a different orientation relative to the vertical rotation axis than the first reclined position, wherein the juvenile-seat recline unit includes a movable recline carriage, a recline lock coupled to the movable recline carriage for movement therewith and coupled releasably to the support frame, and a recline-lock actuator coupled to the recline lock and configured to move the recline lock from a locked position, in which the recline lock extends between and interconnects the movable recline carriage and the support frame to block movement of the movable recline carriage relative to the support frame, and an unlocked position, in which the recline lock is separated from the support frame and the movable recline carriage is free to move about the horizontal pivot axis relative to the support frame, and wherein the recline lock includes a first movable latch that is biased toward the locked position and the recline-lock actuator includes an actuator handle configured to be gripped and actuated by a user and a latch mover coupled to the actuator handle and formed to include a first latch-mover slot that receives a portion of the first movable latch, at least a portion of the first latch-mover slot is arranged to lie at an angle relative to a direction of travel of the recline lock such that the latch mover is configured to withdraw the first movable latch from a first latch opening formed in the support frame to separate the first movable latch from the support frame so that the movable recline carriage is free to move relative to the support frame.

12. The child restraint of claim 11, wherein the recline lock further includes a second movable latch that is biased toward the locked position and the latch mover is formed to include a second latch-mover slot that receives a portion of the second movable latch, at least a portion of the second latch-mover slot is arranged to lie at an angle relative to the direction of travel of the recline lock different than the angle of the first latch-mover slot such that the latch mover is configured to withdraw simultaneously the first movable latch from the first latch opening and the second movable latch from a second latch opening formed in the support frame to separate the first and second movable latches from the support frame so that the movable recline carriage is free to move relative to the support frame.

13. The child restraint of claim 12, wherein the first and second movable latches move toward one another as the latch mover is actuated.

14. The child restraint of claim 12, wherein the movable recline carriage includes a carriage housing surrounding the support frame, the recline lock, and the recline-lock actuator, a first recline-lock carrier beam arranged to lie on a first side of latch mover and coupled to the first movable latch, and a second recline-lock carrier beam arranged to lie on an opposite, second side of the latch mover and coupled to the second movable latch.

15. A child restraint comprising
a juvenile seat adapted to support a child in a vehicle,
a seat base adapted to rest on a vehicle seat, and
a seat-orientation controller fixed to the seat base for movement therewith and relative thereto about a vertical rotation axis and configured to mount the juvenile seat to the seat base for rotation about the vertical rotation axis with the seat-orientation controller, the seat-orientation controller includes a support frame coupled to the seat base and a juvenile-seat recline unit coupled to the support frame and configured to move relative to the support frame and the seat base about a horizontal pivot axis to change the juvenile seat from a first reclined position relative to the seat base to a second reclined position relative to the seat base, the second reclined position having a different orientation relative to the vertical rotation axis than the first reclined position,
wherein the support frame includes a frame base, a first support beam coupled to the frame base and to a first side of the juvenile-seat recline unit, and a second support beam coupled to the frame base and the an opposite, second side of juvenile-seat recline unit, and
wherein the first support beam and the second support beam are each formed to include a first guide slot and a second guide slot spaced apart from the first guide slot.

16. The child restraint of claim 15, wherein the juvenile-seat recline unit further includes a first guide pin that extends through the first guide slot formed in both of the first and second support beams and a second guide pin that extends through the second guide slot formed in both of the first and second support beams.

17. The child restraint of claim 16, wherein the first support beam and the second support beam are each formed to include a plurality of latch openings between the first and second guide slots.

18. The child restraint of claim 17, wherein the juvenile-seat recline unit includes the recline lock having a first movable latch and a second movable latch each biased toward a locked position, the first movable latch is received in one of the plurality of latch openings formed in the first support beam and the second movable latch received in one of the plurality of latch opening formed in the second support beam.

* * * * *